(12) United States Patent
Nakamura et al.

(10) Patent No.: US 9,119,187 B2
(45) Date of Patent: Aug. 25, 2015

(54) COMMUNICATION SYSTEM, TRANSMITTING DEVICE, RECEIVING DEVICE, AND PROCESSOR

(75) Inventors: Osamu Nakamura, Osaka (JP); Hiroki Takahashi, Osaka (JP); Jungo Goto, Osaka (JP); Kazunari Yokomakura, Osaka (JP); Yasuhiro Hamaguchi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 101 days.

(21) Appl. No.: 13/993,264

(22) PCT Filed: Dec. 12, 2011

(86) PCT No.: PCT/JP2011/078658
§ 371 (c)(1),
(2), (4) Date: Jun. 11, 2013

(87) PCT Pub. No.: WO2012/081535
PCT Pub. Date: Jun. 21, 2012

(65) Prior Publication Data
US 2013/0265973 A1 Oct. 10, 2013

(30) Foreign Application Priority Data
Dec. 14, 2010 (JP) .................. 2010-278574

(51) Int. Cl.
*H04Q 7/00* (2006.01)
*H04W 72/04* (2009.01)
*H04J 11/00* (2006.01)
*H04L 1/18* (2006.01)
(Continued)

(52) U.S. Cl.
CPC ........... *H04W 72/04* (2013.01); *H04J 11/0023* (2013.01); *H04L 1/1867* (2013.01); *H04L 25/03146* (2013.01); *H04L 25/03828* (2013.01); *H04L 25/067* (2013.01); *H04L 27/2602* (2013.01); *H04L 27/2623* (2013.01); *H04L 27/2634* (2013.01); *H04W 28/04* (2013.01)

(58) Field of Classification Search
None
See application file for complete search history.

(56) References Cited

U.S. PATENT DOCUMENTS

2003/0190155 A1* 10/2003 Tsutsui et al. ................ 386/111
2009/0168910 A1  7/2009 Futatsugi et al.
(Continued)

FOREIGN PATENT DOCUMENTS

JP    2005-150914 A    6/2005
JP    2007-214824 A    8/2007
(Continued)

OTHER PUBLICATIONS

Haitai Zheng, Angel Lozano, Mohamed Haleem, Multiple ARQ Processes for MIMO Systems, EURASIP Journal on Applied Signal Processing, May 2004, pp. 772-782.
Haltao Zheng, Angel Lozano, Mohamed Haleem, Multiple ARQ Processes for MIMO Systems, EURASIP Journal on Applied Signal Processing, May 2004, pp. 772-782.
(Continued)

*Primary Examiner* — Duc C Ho
(74) *Attorney, Agent, or Firm* — Birch, Stewart, Kolasch & Birch, LLP

(57) ABSTRACT

An encoding unit encodes an information bit sequence. An IDFT unit generates a spectrum from the signals of the information bit sequence. A clipping unit generates, when re-transmitting the information bit sequence, a transmission spectrum that differs from that of the previous transmission. An OFDM signal generation unit transmits the transmission spectrum.

8 Claims, 20 Drawing Sheets

(51) Int. Cl.
*H04L 25/03* (2006.01)
*H04L 27/26* (2006.01)
*H04L 25/06* (2006.01)
*H04W 28/04* (2009.01)

(56) References Cited

U.S. PATENT DOCUMENTS

2009/0175369 A1 7/2009 Atarashi et al.
2010/0104041 A1 4/2010 Ibi et al.
2011/0038346 A1* 2/2011 Yokomokora et al. ........ 370/330

FOREIGN PATENT DOCUMENTS

JP 2008-219144 A 9/2008
JP 2009-159413 A 7/2009

OTHER PUBLICATIONS

Ryunosuke Kawakita, et al., "A Study on Frequency Resource Managements Exploiting Spectrum Clipped Transmit Signals", The Institute of Electronics, Information and Communication Engineers Sogo Taikai Koen Ronbunshu, Mar. 4, 2009, 2009 Nen Tsushin (1), p. 512.

* cited by examiner

FIG. 9

| RETRANSMISSION COUNT | OUTPUT BIT INFORMATION | | |
|---|---|---|---|
| | SYSTEMATIC BIT | PARITY BIT 1 | PARITY BIT 2 |
| 0 | 1 TO $N_{info}$ | 1 TO $N_{info}$ | 1 TO $N_{info}$ |
| 2L+1 | 1 TO $N_{info}$ | 1 TO ($N_{info}/2$) | 1 TO ($N_{info}/2$) |
| 2L+2 | 1 TO $N_{info}$ | ($N_{info}/2$)+1 TO $N_{info}$ | ($N_{info}/2$)+1 TO $N_{info}$ |

FIG. 10

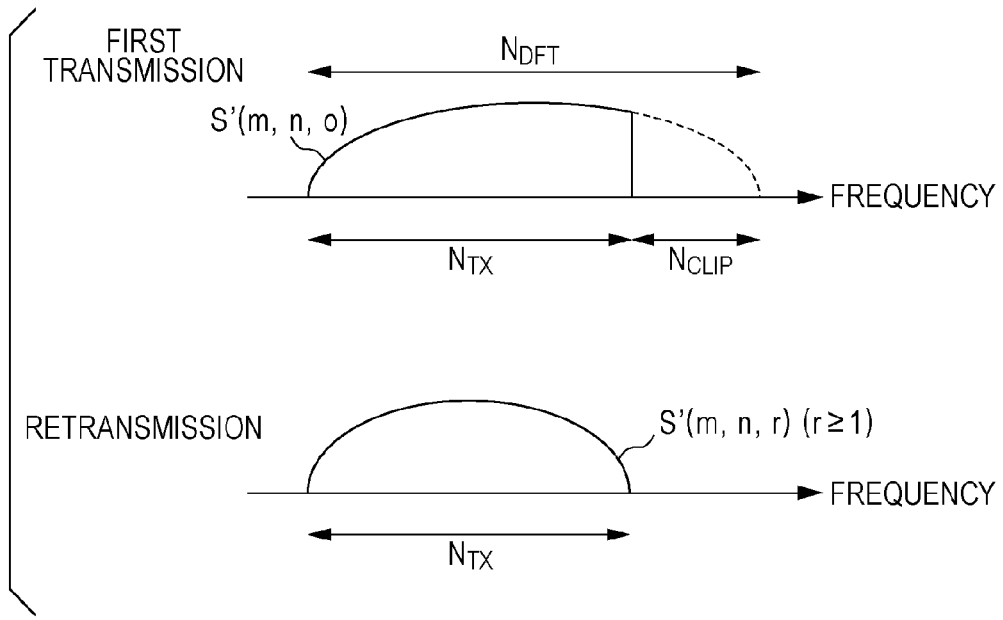

FIG. 11

| RETRANSMISSION COUNT | OUTPUT BIT INFORMATION | | |
|---|---|---|---|
| | SYSTEMATIC BIT | PARITY BIT 1 | PARITY BIT 2 |
| 0 | 1 TO $N_{info}$ | 1 TO ($N_{info}/2$) | 1 TO ($N_{info}/2$) |
| 2L+1 | 1 TO ($N_{info}/2$) | ($N_{info}/2$)+1 TO $N_{info}$ | ($N_{info}/2$)+1 TO $N_{info}$ |
| 2L+2 | ($N_{info}/2$)+1 TO $N_{info}$ | 1 TO ($N_{info}/2$) | 1 TO ($N_{info}/2$) |

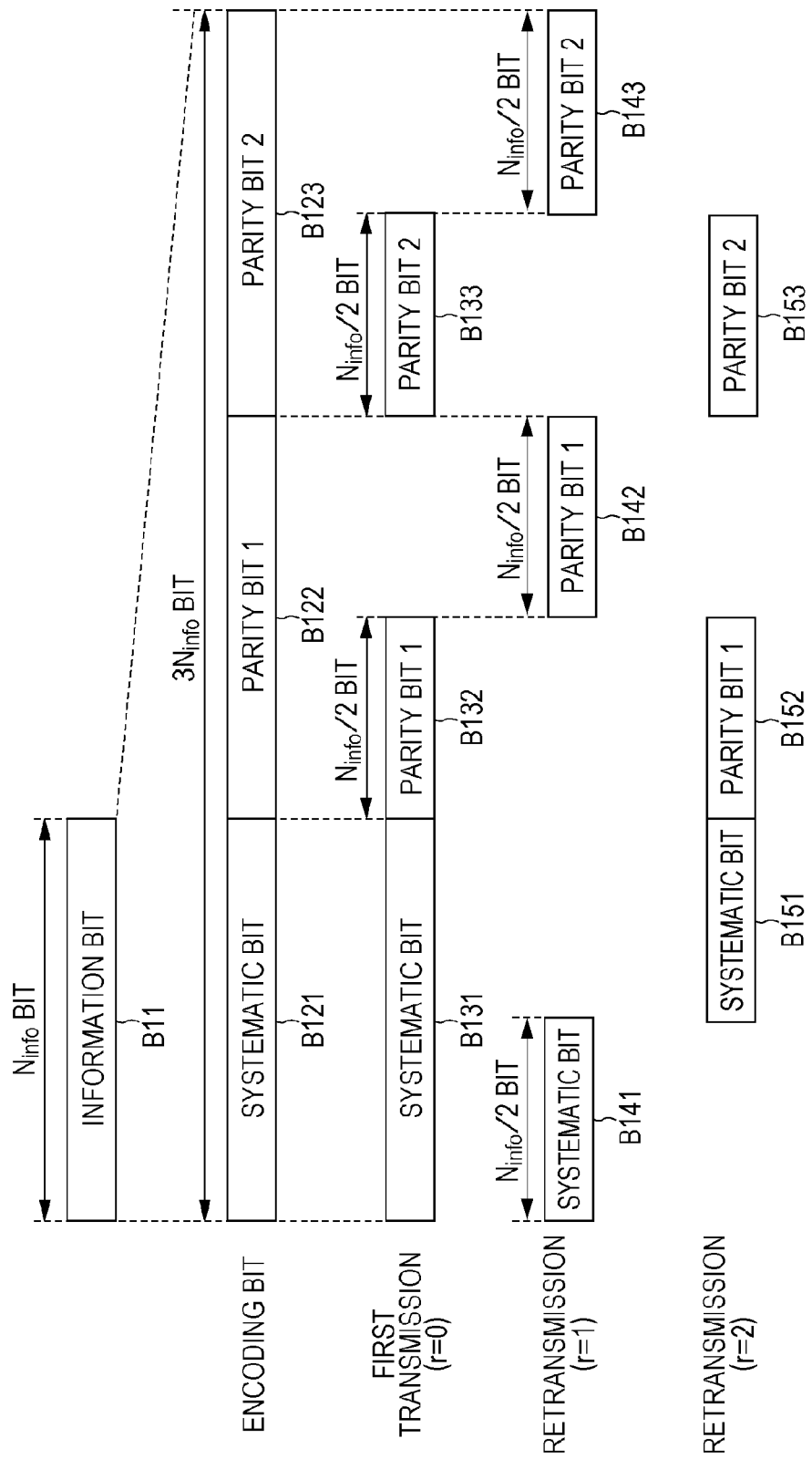

FIG. 16

FIG. 22
PRIOR ART
(A) SINGLE CARRIER TRANSMISSION
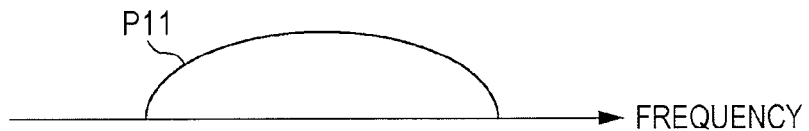
(B) Clipping SINGLE CARRIER
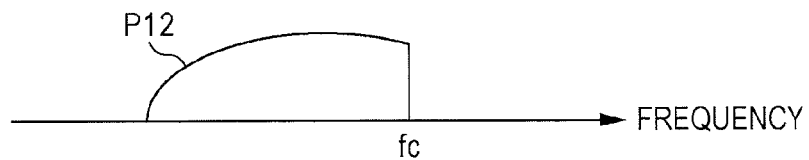
FIG. 23
PRIOR ART
FIRST TRANSMISSION
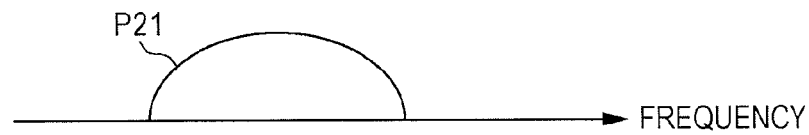
RETRANSMISSION
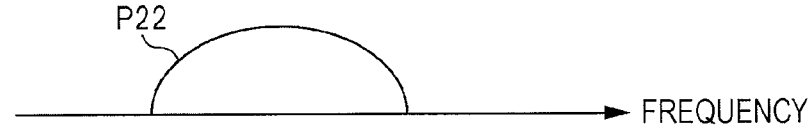

COMMUNICATION SYSTEM, TRANSMITTING DEVICE, RECEIVING DEVICE, AND PROCESSOR

TECHNICAL FIELD

The present invention relates to a communication system, transmitting device, receiving device, and processor. The present application claims priority to Japanese Patent Application No. 2010-278574 filed on Dec. 14, 2010, the entire contents of which are incorporated by reference herein.

BACKGROUND ART

As large amounts of data transmission are expected from next-generation mobile communications, there is a need to widen the bandwidth to which transmission signals are arranged. However, when performing a widening of the bandwidth, the transmission signal is received on the receiving device under a large multi-path (channel) influence. That is to say, with wideband single carrier transmission, inter-symbol interference (ISI) caused by multi-paths causes performance to significantly degrade. If these multi-paths are observed in frequency-domain, this results in frequency selective fading, and as the number of paths increase, the frequency selectiveness becomes stronger.

In recent years, regarding single carrier transmission and a widely known technology as an example, the signal is converted into frequencies at the receiving device, the frequency selective fading is compensated in the frequency domain, and the frequency domain equalization suppresses inter-symbol interference by a comparatively low calculation amount after returning this to a time domain signal. However, according to frequency domain equalization, the ISI may not be completely suppressed, and so turbo equalization is attracting attention. According to turbo equalization, an ISI replica is generated from bits after the frequency domain equalization, and the ISI is removed by subtraction from the receiving signal.

Also, according to PTL 1 and PTL 2, a technology is proposed in which a portion of the frequency spectrum of the transmission data (hereafter, referred to as simply spectrum) is removed and transmitted. This is illustrated schematically in FIG. 22.

FIGS. 22(A) and (B) are schematic diagrams illustrating when a portion of the spectrum is not deleted and when it is deleted. Further, the horizontal axis in FIGS. 22(A) and (B) illustrates frequency.

In FIG. 22(A), a spectrum P11 given a reference sign P11 represents a spectrum from a single carrier transmission, and represents a spectrum transmitted without any deletion. In FIG. 22(B), a spectrum P12 given a reference sign P12 represents a spectrum from single carrier transmission, and represents a spectrum transmitted with a portion deleted (frequency components higher than fc). According to the transmission using the spectrum P12, despite being smaller, the frequency band used during the transmission is able to transmit the same amount of information as when using the spectrum P11, and so the frequency utilization efficiency may be increased.

However, according to the transmission using the spectrum P12, the spectrum is degraded (also referred to as clipping, frequency domain punctures, or deletions) when received by the receiving device. As a result, transmission performance is degraded as compared to when the entire spectrum is transmitted. Thus, according to such a transmission, the frequency transmitted with a removed spectrum has zero channel gain, that is to say, received via a channel in which the gain has been degraded by frequency selective fading, and so the performing of turbo equalization or similar has been proposed.

According to PTL 1 and PTL 2, performance restoration is attempted by a iterative equalization process, but with actual mobile communication systems, there are cases of errors occurring in transmission even after performing turbo equalization processing when there is extremely strong frequency selective fading. Thus, with many wireless communication systems, a technology called HARQ (Hybrid Automatic Repeat reQuest or Hybrid ARQ) is adopted. Receiving devices using HARQ determine whether or not data (packets) is correctly decoded by using an error detection signal added to the data by the transmitting device. The receiving device notifies the transmitting device with an ACK (acknowledge) signal when the packet has been decoded correctly, and the transmitting device transmits the next packet. Conversely, the receiving device notifies the transmitting device with a NAK (negative acknowledge) when the packet has not been correctly decoded, and the transmitting device retransmits the packet.

A retransmission method called chase combining, or CC retransmission, is a well-known example of a retransmission method.

FIG. 23 is a schematic diagram describing the CC retransmission. Further, the horizontal axis in FIG. 23 represents frequency.

In FIG. 23, a spectrum P21 given a reference sign P21 represents a spectrum of a first transmission opportunity. A spectrum P22 given a reference sign P22 represents a spectrum of a retransmission opportunity. As illustrated in FIG. 23, the CC retransmission retransmits the same data during the retransmission opportunity as that of the first transmission opportunity. According to communication systems adopting the CC retransmission, the receiving device may correctly decode the transmitted signal when noise at the receiving device or the channel state for the retransmission opportunity is different than that of the first transmission opportunity.

Also, a retransmission method known as incremental redundancy (IR), or IR retransmission, is a well-known example of a retransmission method different from the CC retransmission. The IR retransmission is a retransmission method in which punctured parity bits not transmitted during the first transmission opportunity are transmitted with priority over bits transmitted not being punctured. As different bits are transmitted according to communication systems adopting IR retransmission, the receiving device may increase the coding gain over that of the CC retransmission, which transmits the same parity bits.

CITATION LIST

Patent Literature

PTL 1: Japanese Unexamined Patent Application Publication No. 2008-219144
PTL 2: Japanese Unexamined Patent Application Publication No. 2009-159413

DISCLOSURE OF INVENTION

Problems to be Solved by the Invention

Regarding wideband single carrier transmission, the ensemble average of the spectrum energy at each orthogonal frequency point is a constant value. However, when the transmission bit sequence is randomized, the instantaneous energy of the frequency spectrum is different for each frequency.

FIGS. 24(A) and (B) are schematic diagrams illustrating frequency spectra, one when a low frequency spectrum is clipped and one when a high frequency spectrum is clipped. Further, the horizontal axis in FIGS. 24(A) and (B) represents frequency. In FIGS. 24(A) and (B), a spectrum P31 surrounded by a dashed line given a reference sign P31 (low frequency spectrum) and a spectrum P32 surrounded by a dashed line give a reference sign P32 (high frequency spectrum) are spectra to be clipped. FIG. 24 illustrates that the spectrum P31 is a low frequency spectrum as compared to the spectrum P32.

The frequency spectrum in FIG. 24 has many high frequency spectrum components, that is to say, energy directs toward high frequencies. For this reason, when clipping the high frequency spectrum P32 such as in FIG. 24(B), when clipping the high frequency spectrum P32 such as in FIG. 24(B), more energy is lost as compared to when clipping the low frequency spectrum P31 as in FIG. 24(A).

Therefore, regarding the retransmission of the same spectrum, when transmitting the spectrum P32, there is an issue in which the risk of errors occurring again is high due to the loss of energy as compared to when transmitting the spectrum P31. There are also cases when the risk of errors occurring is higher when transmitting the spectrum P31 as compared to when transmitting the spectrum P32, as the direction energy moves toward and the information bit transmitted is different each time.

According to the related art, regarding communication systems performing retransmission control in this way, there is an issue with a decrease in transmission efficiency due to errors occurring during the retransmission opportunity of information bits.

The present invention is the result of considering the previously described issues, and so provides a communication system, transmitting device, receiving device, and processor that may increase transmission efficiency regarding communication systems that perform retransmission control.

Means for Solving the Problems (1) The invention is designed to solve the previously described problems, and an embodiment of the invention is a communication system including a transmitting device for generating a spectrum from a coded information bit sequence, and transmitting a transmission spectrum in which a portion of the generated spectrum is removed, and a receiving device for receiving and decoding the transmission spectrum transmitted from the transmitting device, wherein the transmitting device generates and transmits a transmission spectrum different from that of the previous transmission when retransmitting the information bit sequence, and the receiving device receives and decodes the transmission spectrum different from the previous reception when the information bit sequence is re-received.

(2) Also, regarding the previously described communication system as an embodiment of the invention, the transmitting device generates a transmission spectrum in which the removed spectrum is different from that of the previous transmission, and the receiving device decodes the transmission spectrum in which the removed spectrum is different from that of the previous reception.

(3) Also, regarding the previously described communication system as an embodiment of the invention, the transmitting device gives priority to and transmits the spectrum removed at the previous transmission over the spectrum not removed.

(4) Also, regarding the previously described communication system as an embodiment of the invention, the transmitting device transmits the transmission spectrum in which a spectrum of a bandwidth different from that of the previous transmission is removed, and the receiving device receives and decodes the transmission spectrum in which the spectrum of a bandwidth different from that of the previous transmission is removed.

(5) Also, regarding the previously described communication system as an embodiment of the invention, the transmitting device determines the transmitting power of the transmission spectrum depending on the bandwidth to be removed.

(6) Also, regarding the previously described communication system as an embodiment of the invention, the transmitting device generates the transmission spectrum for each of a plurality of streams, spatially multiplexes and transmits the generated transmission spectra, and generates a transmission spectrum different from the previous transmission, for each of the streams, when retransmitting the information bit sequence, and wherein the receiving device receives and decodes the transmission signal different from the previous reception, for each of the streams, when the information bit sequence is received again.

(7) Also, regarding the previously described communication system as an embodiment of the invention, the previous transmission is a first transmission of the information bit sequence to be retransmitted, and the previous reception is a first reception of the retransmitted information bit sequence.

(8) Also, an embodiment of the invention is a transmitting device for generating a spectrum from a coded information bit sequence and transmitting a transmission spectrum in which a portion of the generated spectrum has been removed, wherein a transmission spectrum different from that of the previous transmission is generated and transmitted when retransmitting the information bit sequence.

(9) Also, an embodiment of the invention is a receiving device for receiving and decoding a transmission spectrum yielded by a spectrum being generated from a coded information bit sequence, and a portion of the generated spectrum being removed, wherein a transmission spectrum different from that of the previous reception is received and decoded when re-receiving the information bit sequence.

(10) Also, an embodiment of the invention is a processor for generating a transmission spectrum in which, when retransmitting a coded information bit sequence, a portion of a spectrum generated from the information bit sequence is removed so that the transmission spectrum is different from that of the previous transmission.

(11) Also, an embodiment of the invention is a processor for receiving and decoding a transmission spectrum in which, when retransmitting a coded information bit sequence, a portion of a spectrum generated from an information bit sequence is removed so that the transmission spectrum is different from the previous transmission.

Effects of the Invention

According to the present invention, transmission efficiency may be increased regarding communication systems that perform retransmission control.

BRIEF DESCRIPTION OF THE DRAWINGS

FIG. 9 is a schematic diagram illustrating an example output bit information table related to the present embodiment.

FIG. 10 is a schematic diagram illustrating an example frequency spectrum related to the present embodiment.

FIG. 11 is a schematic diagram illustrating an example output bit information table related to a first modification of the present embodiment.

FIG. 12 is a schematic diagram illustrating bits output by an encoding unit and a buffer unit related to a first modification of the present embodiment.

FIG. 16 is a schematic diagram illustrating an example frequency spectrum related to the present embodiment.

FIG. 22 is a schematic diagram illustrating an example spectrum of the related art.

FIG. 23 is a schematic diagram illustrating another example spectrum of the related art.

BEST MODE FOR CARRYING OUT THE INVENTION

Hereafter, embodiments will be described in detail with reference to the drawings.

Figure 1:
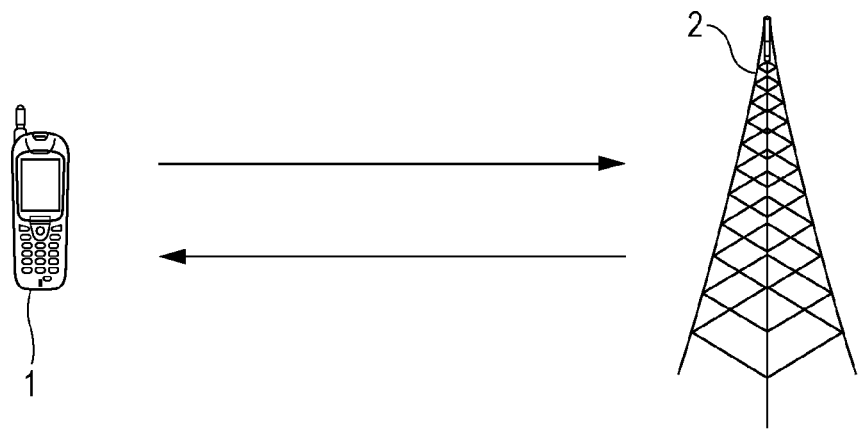
FIG. 1 is a schematic diagram illustrating a communication system related to an embodiment of the present invention.

FIG. 1 is a schematic diagram of a communication system related to an embodiment of the present invention. The communication system in this figure is provisioned with a mobile station device 1 and a base station device 2. The mobile station device 1 transmits a signal to the base station device 2 (communication from the mobile station device to the base station device is called uplink). Also, the base station device 2 transmits a signal to the mobile station device 1 (communication from the base station device to the mobile station device is called downlink).

HARQ (Hybrid Automatic Repeat reQuest) is performed at the communication system in FIG. 1. For example, the base station device 2 determines whether or not the data (packet) has been correctly decoded using an error detection signal added to the data by the mobile station device 1 regarding the uplink. The base station device 2 notifies the mobile station device 1 with an ACK (acknowledge) signal when the packet has been decoded correctly, and the mobile station device 1 transmits the next packet. Conversely, the base station device 2 notifies the mobile station device 1 with a NAK (negative acknowledge) signal when the packet has not been decoded correctly, and the mobile station device 1 retransmits the packet. In the same way, HARQ may be performed at the communication system regarding the downlink as well. Also, HARQ may be performed regarding one of the uplink and downlink, or both.

Further, though the description of each of the following embodiments assumes a single carrier transmission for the communication method, the present invention is not limited thusly, and may be applied to communication systems using multi-carrier transmission methods such as OFDM (Orthogonal Frequency Division Multiplexing) or MC-CDMA (Multi-Carrier Code Division Multiple Access). Also, according to a first and a second Embodiment, the description assumes that the base station device 2 makes notification with either the ACK or the NAK regarding the data which the mobile station device 1 has transmitted, in the case of the uplink. However, the present invention is not limited thusly and may be applied to the downlink as well. Also, the number of receive antennas and the number of transmit antennas regarding each embodiment may be one or may be more than one. Also, MIMO (Multiple Input Multiple Output) transmission may be performed when using multiple antennas.

First Embodiment

According to the present embodiment, the mobile station device 1 in FIG. 1 is called a mobile station device a1, and the base station device 2 is called a base station device b1.

<About the Mobile Station Device a1>

Figure 2:
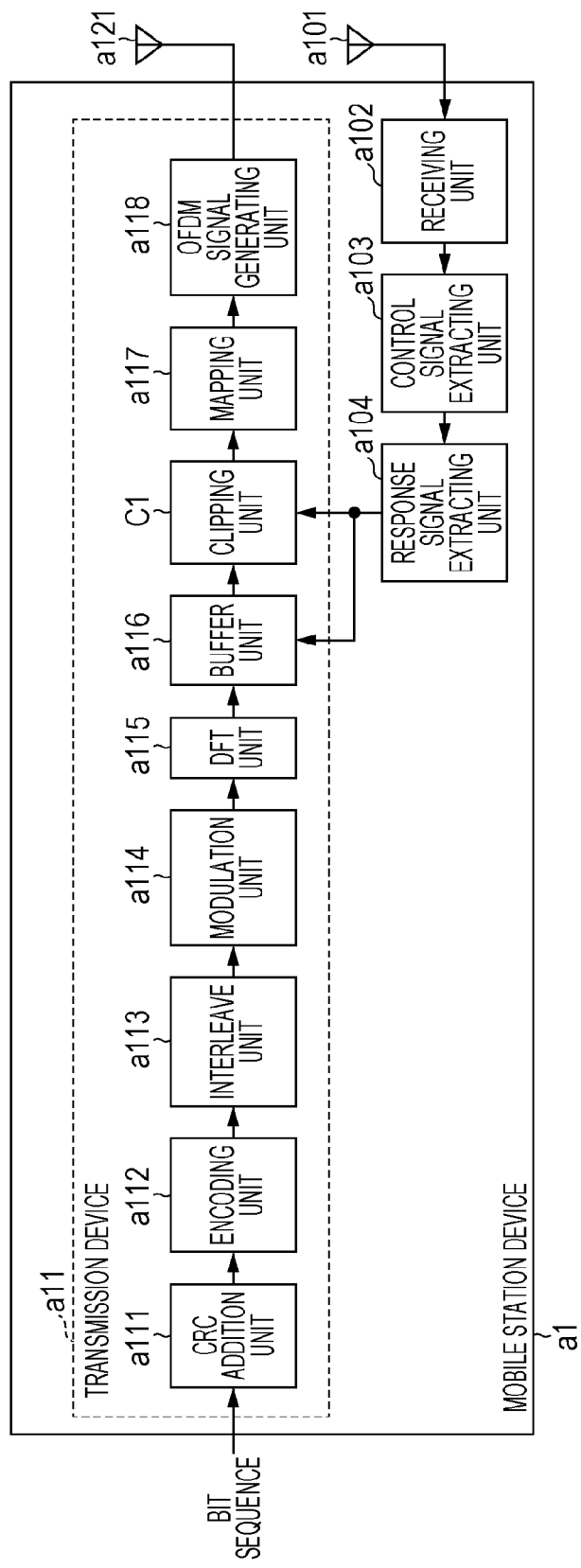
FIG. 2 is a schematic block diagram illustrating a configuration of a mobile station device related to a first Embodiment of the present invention.

FIG. 2 is a schematic block diagram illustrating the configuration of the mobile station device a1 related to the first Embodiment of the present invention. The mobile station device a1 in this figure is configured with an antenna a101, a receiving unit a102, a control signal extraction unit a103, a response signal extraction unit a104, and a transmitting device a11. The transmitting device a11 is configured with a CRC (Cyclic Redundancy Check) addition unit a111, an encoding unit a112, an interleave unit a113, a modulation unit a114, a DFT (Discrete Fourier Transform) unit a115, a buffer unit a116, a clipping unit C1, a mapping unit a117, an OFDM signal generating unit a118, and an antenna a121. Also, the mobile station device a1 is provisioned with other well-known, general functions of a mobile station device.

The receiving unit a102 receives the signal transmitted from the base station device b1 via the antenna a101. The receiving unit a102 performs down conversion from carrier frequency band, filtering, A/D (analog to digital) conversion, and demodulation processing on the received signal, and outputs the post-processing information to the control signal extraction unit a103. The control signal extraction unit a103 divides the information input from the receiving unit a102 into a control information and other user information on the basis of discrimination information notified from the base station device b1. The control signal extraction unit a103 outputs the divided control information to the response signal extraction unit a104. Also, the control signal extraction unit a103 outputs the divided user information to an output control unit (not illustrated) for controlling the output of displays and sound. Further, the divided control information includes coding information representing the coding rate used for communication with the base station device b1, modulation method information representing the modulation method, mapping information, automatic retransmission request information representing the ACK or NAK, and other information.

The response signal extraction unit a104 extracts the automatic retransmission request information from the control information input from the control signal extraction unit a103. The response signal extraction unit a104 outputs the extracted automatic retransmission request information to the buffer unit a116 and the clipping unit C1. Further, the coding information within the control information is output to the encoding unit a112, and the demodulation method information is output to the modulation unit a114. Also, the downlink mapping information within the control information is output to the receiving unit a102, and the uplink mapping information is output to the mapping unit a117.

The bit sequence of the data transmitted to the base station device b1 is input into the CRC addition unit a111. The CRC addition unit a111 extracts the bit sequence from the input bit sequence in units of a predetermined bit count, and generates the CRC code using this bit sequence for each extracted bit sequence. The CRC addition unit a111 adds the generated CRC code to this bit sequence for each extracted bit sequence. Further, this CRC code is information for determining whether or not the signal from the mobile station device a1 is decoded correctly at the base station device b1. The CRC addition unit a111 outputs the bit sequence with the added CRC code to the encoding unit a112.

The encoding unit a112 performs error correction coding on the bit sequence input from the CRC addition unit a111 at the coding rate represented by the coding information notified from the base station device b1. The encoding unit a112 outputs the coded bit sequence to the interleave unit a113.

The interleave unit a113 performs a sorting of the bits on the bit sequence input from the encoding unit a112. The interleave unit a113 outputs the bit sequence in which the sorting has been performed to the modulation unit a114.

The modulation unit a114 generates modulation symbols on the bit sequence input from the interleave unit a113 by modulation with the modulation method represented by the modulation method information notified from the base station device b1. Further, modulation methods include QPSK (Quadrature Phase Shift Keying) and 16QAM (Quadrature Amplitude Modulation), for example. The modulation unit a114 outputs the generated modulation symbols to the DFT unit a115. The DFT unit a115 performs discrete Fourier transformations for $N_{DFT}$ frequency points (referred to as $N_{DFT}$ points and the frequency points of discrete Fourier transformations and inverse discrete Fourier transformations are referred to as simply points) on the modulation symbols input from the modulation unit a114 per $N_{DFT}$ modulation symbols. As a result, the DFT unit a115 transforms the modulation symbols from time domain signals into frequency domain signals (frequency spectrum) S(m, n). Here, m is an integer representing the discrete Fourier transform point within a range equal to $0 \leq m \leq N_{DFT}-1$. Also, n is an integer representing the transmitting sequence. The DFT unit a115 outputs the transformed frequency spectrum to the buffer unit a116.

The buffer unit a116 stores the frequency spectrum S(m, n) input from the DFT unit a115. When it is determined that the automatic retransmission request information input from the response signal extraction unit a104 is representing the ACK, buffer unit a116 outputs to the clipping unit C1 the frequency spectrum S(m, N1+1) to be transmitted next after the last frequency spectrum S(m, (n=the frequency spectrum numbered N1) output to the clipping unit C1 (for example, the next frequency spectrum in the sequence input from the DFT unit a115). Conversely, when it is determined that the automatic retransmission request information is representing the NAK input from the response signal extraction unit a104, the buffer unit a116 outputs the frequency spectrum S(m, N1) last output to the clipping unit C1 once more to the clipping unit C1.

The clipping unit C1 clips the frequency spectrum for the $N_{CLIP}$ points from the frequency spectrum S(m, N) for the $N_{DFT}$ points input from the buffer unit a116 (referred to as clip processing). Specifically, when the automatic retransmission request information input from the response signal extraction unit a104 represents an ACK, that is to say, the first transmission opportunity, the clipping unit C1 clips the spectrum from the $N_{CLIP}$ points having high frequencies from the $N_{DFT}$ points, that is to say the high-frequency frequency spectrum. Conversely, when the automatic retransmission request information is representing a NAK input from the response signal extraction unit a104, that is to say, the retransmission opportunity, the clipping unit C1 clips the spectrum from the $N_{CLIP}$ points having low frequencies from the $N_{DFT}$ points, that is to say, the low-frequency spectrum for the $N_{CLIP}$ points. That is to say, the clipping unit C1 clips frequency components from the frequency spectrum to be retransmitted that is different from the frequency spectrum previously transmitted (the first transmission opportunity according to the present embodiment).

Further, details on the clip processing performed by the clipping unit C1 will be described later.

The clipping unit C1 outputs the frequency spectrum S'(m, n) (transmission spectrum) for the $N_{TX}$ points ($N_{TX}=N_{DFT}-N_{CLIP}$), which has been clip processed, to the mapping unit a117.

The mapping unit a117 maps the frequency spectrum S'(m, n) for the $N_{TX}$ points input from the clipping unit C1 to the $N_{FFT}$ point frequency points on the basis of the mapping information notified by the base station device b1. Further, the mapping unit a117 maps all frequency points besides the mapped $N_{TX}$ points to zero (spectrum is not mapped). The mapping unit a117 outputs the mapped signal ($N_{FFT}$ point signal) to the OFDM signal generating unit a118.

The OFDM signal generating unit a118 performs $N_{FFT}$ point inverse fast Fourier transform (IFFT) on the signal input from the mapping unit a117. The OFDM signal generating unit a118 adds a CP (cyclic prefix), performs D/A (digital to analog) conversion, up conversion to the carrier frequency band, analog filtering processing on the transformed signal, and transmits the processed signal via the antenna a121. The signal transmitted from the antenna a121 is received by the antenna of the base station device b1 over the channel.

Figure 3:
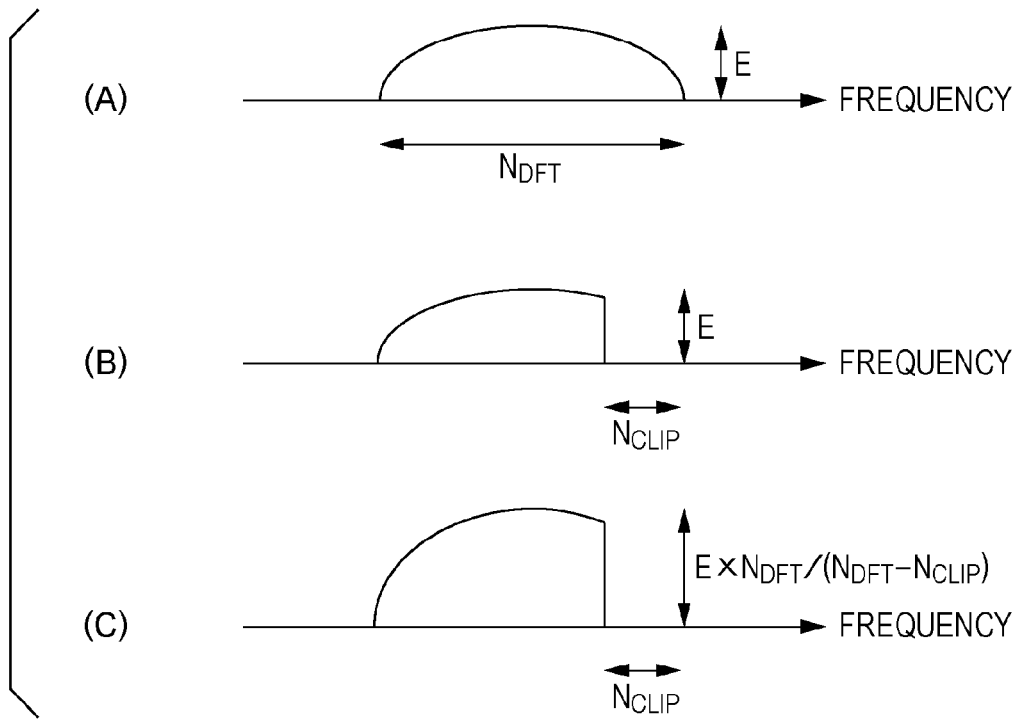
FIG. 3 is a schematic diagram describing the transmitting power related to the present embodiment.

The transmitting power will be described here. FIG. 3(A) illustrates a case when the spectrum for the $N_{DFT}$ points is transmitted as it is (without clipping). E represents the power spectrum density at this time (transmitting energy). Also, FIG. 3(B) illustrates a case when the spectrum for the $N_{DFT}$ points is transmitted after removing the $N_{CLIP}$ points. At this time, E represents the power spectrum density similar to FIG. 3(A), and so a transmission with less interference to another cell (the base station device) than that in FIG. 3(A) may be performed. Further, by increasing the power spectrum density to twice that of $N_{DFT}/(N_{DFT}-N_{CLIP})$ as in FIG. 3(C), a transmission in which the energy per bit equals that in FIG. 3(A) may also be performed.

<About the Clip Processing>

The following describes in detail the clip processing performed by the clipping unit C1.

Figure 4:
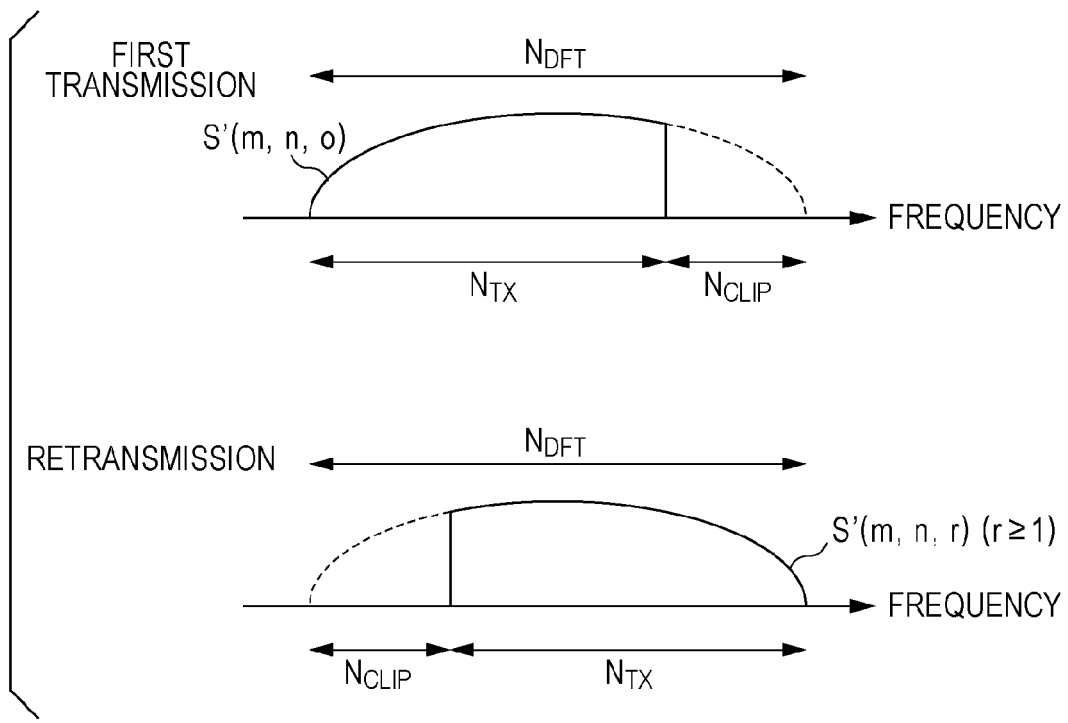
FIG. 4 is a schematic diagram illustrating an example frequency spectrum related to the present embodiment.

FIG. 4 is a schematic diagram illustrating an example of the frequency spectrum S'(m, n) related to the present embodiment. This figure illustrates the frequency spectrum S'(m, n) after the clipping unit C1 has performed the clip processing. The horizontal axis in this figure represents frequency.

In FIG. 4, a frequency spectrum S'(m, n, r) on a solid line given a reference numeral of S'(m, n, r) represents the frequency spectrum S'(m, n) in which the number of retransmissions is at an r number of attempts. Further, the frequency spectrum S'(m, n) for the first transmission opportunity has an r value of zero, that is to say, this is expressed as the frequency spectrum S'(m, n, 0). The frequency spectrum including the dotted line and the solid line in this figure represents the frequency spectrum S(m, n) input into the clipping unit C1.

FIG. 4 illustrates the clipping of the frequency spectrum for $N_{CLIP}$ points from the $N_{DFT}$ points at a high frequency by the clipping unit C1 at the first transmission opportunity (r=0). In this case, the clipping unit C1 outputs the frequency spectrum S'(m, n, 0) for the $N_{TX}$ points from the $N_{DFT}$ points at a low frequency to the mapping unit a117.

Also, FIG. 4 illustrates the clipping of the frequency spectrum for an $N_{CLIP}$ points from the $N_{DFT}$ points at a low frequency by the clipping unit C1 at the retransmission opportunity (r≥1). In this case, the clipping unit C1 outputs the frequency spectrum S'(m, n, r) (r≥1) for the $N_{TX}$ points from the $N_{DFT}$ points at a high frequency to the mapping unit a117.

<About the Base Station Device b1>

Figure 5:
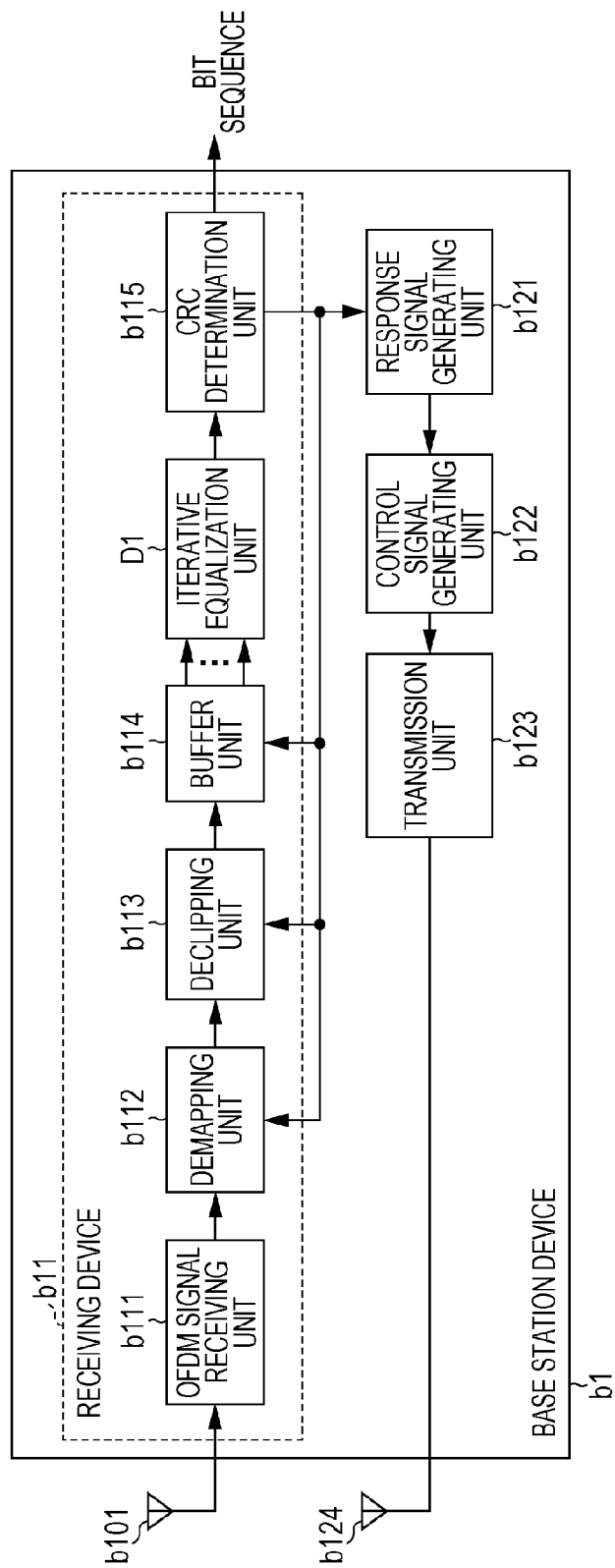
FIG. 5 is a schematic block diagram illustrating a configuration of a base station device related to the present embodiment.

FIG. 5 is a schematic block diagram illustrating a configuration of the base station device b1 related to the present embodiment. The base station device b1 in this figure is configured with an antenna b101, a receiving device b11, a response signal generating unit b121, a control signal generating unit b122, a transmitting unit b123, and an antenna b124. The receiving device b11 is configured with an OFDM signal receiving unit b111, a demapping unit b112, a declipping unit b113, a buffer unit b114, an iterative equalization unit D1, and a CRC determination unit b115. Also, the base station device b1 is provisioned with other well-known, general functions of a base station device.

The OFDM signal receiving unit b111 receives the signal transmitted by the mobile station device a1 via the antenna b101. The OFDM signal receiving unit b111 performs down conversion from the carrier frequency band, analog filtering, A/D conversion, CP removal, and $N_{FFT}$ point FFT processing on the received signal, and outputs the processed signal to the demapping unit b112.

The demapping unit b112 extracts the frequency spectrum for the $N_{TX}$ points arranged in the selected frequency band from the $N_{FFT}$ points of the receiving frequency points, based on the mapping information of the uplink. The demapping unit b112 outputs the extracted frequency spectrum to the declipping unit b113.

The CRC determination result information representing whether or not the signal received from the mobile station device a1 has been correctly decoded is input into the declipping unit b113 from the later-described CRC determination unit b115. The base station device b1 generates and transmits to the mobile station device a1 the automatic retransmission request information depending on this CRC determination result information, and so this CRC determination result information is information equivalent to the automatic retransmission request information. Also, this CRC determination result information includes information representing the number of times the bit sequence of the transmitting signal could not be decoded, and so this information is information equivalent to the number of retransmissions.

The declipping unit b113 adds a zero to the $N_{CLIP}$ points clipped by the mobile station device a1 in the frequency spectrum input from the demapping unit b112 on the basis of the CRC determination result information input from the CRC determination unit b115. That is to say, the declipping unit b113 generates the frequency spectrum for the $N_{DFT}$ points from the frequency spectrum for the $N_{TX}$ points by inserting zeros into the $N_{CLIP}$ points.

According to the example in FIG. 4, specifically when the CRC determination result information represents that the decoding has been correctly performed (for the previous signal), that is to say, the first transmission opportunity, zeroes are added to the $N_{CLIP}$ points at the high frequencies of the input frequency spectrum S'(m, n, 0) to form the frequency spectrum for the $N_{DFT}$ points.

Conversely, when the CRC determination result information represents that the decoding has not been correctly performed, that is to say, the retransmission opportunity, zeroes are added to the $N_{CLIP}$ points at the low frequencies of the input frequency spectrum S'(m, n, r) to form the frequency spectrum for the $N_{DFT}$ points.

The declipping unit b113 outputs the generated frequency spectrum to the buffer unit b114. Further, when the base station device a1 notifies the mobile station device b1 with the information representing the number of retransmissions as the control information, the declipping unit b113 may perform the previously described processing to determine whether the current state is the first transmission opportunity or the retransmission opportunity by using the number of retransmissions in this information, and in this case, the CRC determination information does not have to be input into the declipping unit b113.

The buffer unit b114 stores the frequency spectrum input from the declipping unit b113 for each first transmission and retransmission. When the CRC determination result information input from the CRC determination unit b115 (for the previous signal) represents the first transmission opportunity, that is to say that the decoding has been performed correctly, the buffer unit b114 outputs the frequency spectrum of the first transmission opportunity to the iterative equalization unit D1. Conversely, when the CRC determination result information input from the CRC determination unit b115 represents the retransmission opportunity, that is to say that the decoding has not been performed correctly, the buffer unit b114 outputs to the iterative equalization unit D1 the frequency spectrum of the stored first transmission opportunity and the retransmission opportunity (the first transmission opportunity and the retransmission opportunity may also be referred to as the transmission opportunity), that is to say, all of the frequency spectrum received during the previous transmission opportunity.

The iterative equalization unit D1 removes the symbol interference (ISI) due to the channel configured from multipaths from the frequency spectrum input from the buffer unit b114, and estimates the bit sequence transmitted from the transmitting device (referred to as the iterative equalization processing). Further, details on the iterative equalization processing performed by the iterative equalization unit D1 will be described in detail later. The iterative equalization unit D1 outputs the information (bit sequence) to which the iterative equalization processing has been performed to the CRC determination unit b115.

The CRC determination unit b115 extracts the bit sequence from the bit sequence input from the iterative equalization unit D1 in units of a previously determined bit number. The CRC determination unit b115 extracts the CRC code from the extracted bit sequence, and also generates the CRC code using the bit sequence other than the CRC code. The CRC determination unit b115 determines whether or not the signal received from the mobile station device a1 has been decoded correctly by determining whether or not the extracted CRC code and the generated CRC code match. The CRC determination unit b115 outputs the CRC determination result information representing this determination result to the demapping unit b112, the declipping unit b113, the buffer unit b114, and the response signal generating unit b121. Here, the CRC determination unit b115 counts the number of times it has been determined that the decoding has not been correctly performed, and outputs the CRC determination result information including the count result information.

When the extracted CRC code and the generated CRC code match, that is to say, when it is determined that the signal has been correctly decoded, the CRC determination unit b115 outputs the bit sequence other than the CRC code. Further, when the extracted CRC code and the generated CRC code do not match, that is to say, when it is determined that the signal has not been decoded correctly, the CRC determination unit b115 does not output the bit sequence other than the CRC code.

When the CRC determination result information input from the CRC determination unit b115 represents that the decoding has been performed correctly, the response signal generating unit b121 generates the ACK signal and outputs this to the control signal generating unit b122. Conversely, when the CRC determination result information input from the CRC determination unit b115 represents that the decoding has not been performed correctly, the response signal generating unit b121 generates the NAK signal and outputs this to the control signal generating unit b122.

The control signal generating unit b122 generates the coding rate, modulation method, and mapping information used at the downlink and the uplink based on a receiving quality information calculated using a pilot signal (reference signal). The control signal generating unit b122 generates the control information including the generated information and the automatic retransmission request information representing the ACK or the NAK input from the response signal generating unit b121, and outputs this to the transmitting unit b123.

The transmitting unit b123 performs modulation, D/A (digital to analog) conversion, filtering, and up conversion processing to the carrier frequency band on the input control information and the user information, and transmits the processed signal via the antenna b124.

<About the Iterative Equalization Processing>

The following describes in detail the iterative equalization processing performed by the iterative equalization unit D1.

Figure 6:
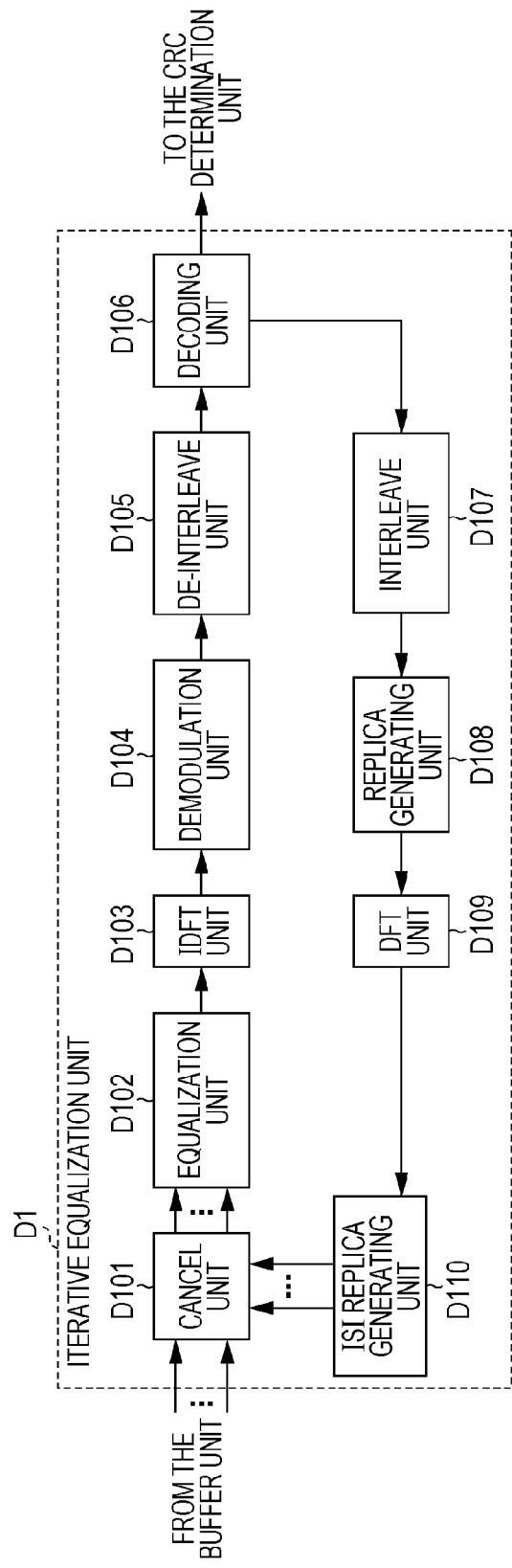
FIG. 6 is a schematic block diagram illustrating a configuration of an iterative equalization unit related to the present embodiment.

FIG. 6 is a schematic block diagram illustrating the iterative equalization unit D1 related to the present embodiment. The configuration in this figure includes a cancel unit D101, an equalization unit D102, an IDFT (inverse discrete Fourier transform) unit D103, a demodulation unit D104, a de-interleave unit D105, a decoding unit D106, an interleave unit D107, a replica generating unit D108, a DFT unit D109, and an ISI replica generating unit D110.

The cancel unit D101 stores the frequency spectrum for each transmission opportunity input from the buffer unit b114. Also, an ISI interference signal replica (referred to as the ISI replica) regarding the frequency spectrum for each transmission opportunity is input into the cancel unit D101 from the ISI replica generating unit D110, which is described later.

The cancel unit D101 subtracts, from the frequency spectrum for each stored transmission opportunity, the ISI replica for that transmission opportunity, respectively. Specifically, the cancel unit D101 subtracts the ISI replica corresponding to the frequency spectrum for the first transmission opportunity from the frequency spectrum for the first transmission opportunity. Also, the cancel unit D101 subtracts the ISI replica corresponding to the frequency spectrum for each retransmission opportunity of a particular r count from the frequency spectrum for the retransmission opportunity of a particular r count (r≥1). The cancel unit D101 outputs the frequency spectrum subtracted for each transmission opportunity to the equalization unit D102.

Further, as there is no input from the ISI replica generating unit D110 at the first iteration of the iterative equalization, the cancel unit D101 outputs the input frequency spectrum to the equalization unit D102. That is to say, regardless of whether the current state is the first transmission opportunity or the retransmission opportunity, the cancel unit D101 outputs the frequency spectrum to the equalization unit D102 for the first iteration of the iterative equalization. However, the present invention is not limited thusly, and the cancel unit D101 may subtract the ISI replica, which is generated at the first transmission opportunity, at the retransmission opportunity.

An uplink channel estimation value estimated by a channel estimating unit (not illustrated) using the pilot signal is input into the equalization unit D102. Here, the channel estimating unit performs the estimation using the pilot in relation to the $N_{TX}$ points transmitted by the spectrum, but in relation to the $N_{CLIP}$ point frequency points for the spectrum clipped at the transmitting side (base station device a1), the channel estimation value for the total $N_{DFT}$ points is calculated in which the gain is set to zero. The equalization unit D102 equalizes the frequency spectrum for each transmission opportunity input from the cancel unit D101 using the channel estimation value. The equalization unit D102 adds, at each transmission opportunity, a weight to the frequency spectrum for each transmission opportunity after equalization creating a combined frequency spectrum, and outputting this to the IDFT unit D103.

The IDFT unit D103 transforms the frequency spectrum, which is a signal in the frequency domain, input from the equalization unit D102 into a time domain signal by performing an inverse discrete Fourier transformation on the $N_{DFT}$ points. The IDFT unit D103 outputs the transformed signal to the demodulation unit D104.

The demodulation unit D104 calculates a bit LLR (log likelihood ratio) using the modulation method information notified to the mobile station device a1 by the base station device b1 and the signal input from the IDFT unit D103. The demodulation unit D104 outputs the calculated bit LLR bit sequence to the de-interleave unit D105.

Regarding the bit sequence input from the demodulation unit D104, the de-interleave unit D105 performs a reversal of the sequence performed by the interleave unit a113, that is to say, returns the sequence to its original order. The de-interleave unit D105 outputs the bit sequence to which the sequencing has been performed to the decoding unit D106.

The decoding unit D106 counts the number of times the bit sequence is input from the de-interleave unit D105. When the counted repetition count is over a predetermined repetition count, the decoding unit D106 performs error correction decoding on the basis of the coding rate represented by the coding information notified to the mobile station device a1 by the base station device b1, and outputs the decoded bit sequence to the CRC determination unit b115. Conversely, when the repetition count counted by the decoding unit D106 is the same as or less than the predetermined repetition count, the bit sequence input from the de-interleave unit D105 is output to the interleave unit D107.

The interleave unit D107 performs a sequencing of the bit sequence input from the decoding unit D106 to the same sequence performed by the interleave unit a113. The interleave unit D107 outputs the bit sequence to which the sequencing has been performed to the replica generating unit D108.

The replica generating unit D108 generates a soft determination replica by modulating the bit sequence input from the interleave unit D107 on the basis of the modulation method information notified to the mobile station device a1 by the base station device b1. The replica generating unit D108 outputs the generated soft determination replica to the DFT unit D109.

The DFT unit D109 performs an $N_{DFT}$ point discrete Fourier transformation on the soft determination replica input from the replica generating unit D108 for each $N_{DFT}$ modulation symbol. The DFT unit D109 outputs the transformed signal (frequency spectrum) to the ISI replica generating unit D110.

The ISI replica generating unit D110 generates the current number of retransmissions for the frequency spectrum that is the same as the frequency spectrum input from the DFT unit D109, and adds a correspondence to the number of retransmissions. The ISI replica generating unit D110 clips the frequency spectrum for the points to which the correspondence has been added by the stored clip information from the frequency spectrum to which correspondence has been added, for each retransmission attempt. As a result, for example, regarding the frequency spectrum to which a correspondence of a number of retransmissions of r=0 has been added, the frequency spectrum is clipped at the $N_{CLIP}$ points having a high frequency, and regarding the frequency spectrum to which a correspondence of a number of retransmissions of r≥1, the frequency spectrum is clipped at the $N_{CLIP}$ points having a low frequency.

The ISI replica generating unit D110 generates an ISI component using the uplink channel estimation value for each transmission opportunity with consideration to the clipping information input from the channel estimating unit (not illustrated) and the frequency spectrum input from the DFT unit D109. As a result, the ISI replica generating unit D110 generates the ISI replica for each transmission opportunity. The ISI replica generating unit D110 outputs the generated ISI replica to the cancel unit D101.

If the ISI replica is complete due according to the previously described configuration, a signal without ISI may be output to the equalization unit D102 by subtraction performed by the cancel unit D101.

According to the present embodiment, when the mobile station device a1 retransmits the information bit sequence in this way, a frequency spectrum S'(m, n) in which the spectrum that is clipped is different from that of the pervious transmission is generated and transmitted, and the frequency spectrum S'(m, n) in which the spectrum that is deleted is different from that previously received by the base station device b1 is decoded. That is to say, when the mobile station device a1 retransmits the information bit sequence, the frequency spectrum S'(m, n) different from the previous transmission is generated and transmitted, and when the base station device b1 receives the information bit sequence again, the frequency spectrum S'(m, n) different from the previous reception is received and decoded.

Figure 7:
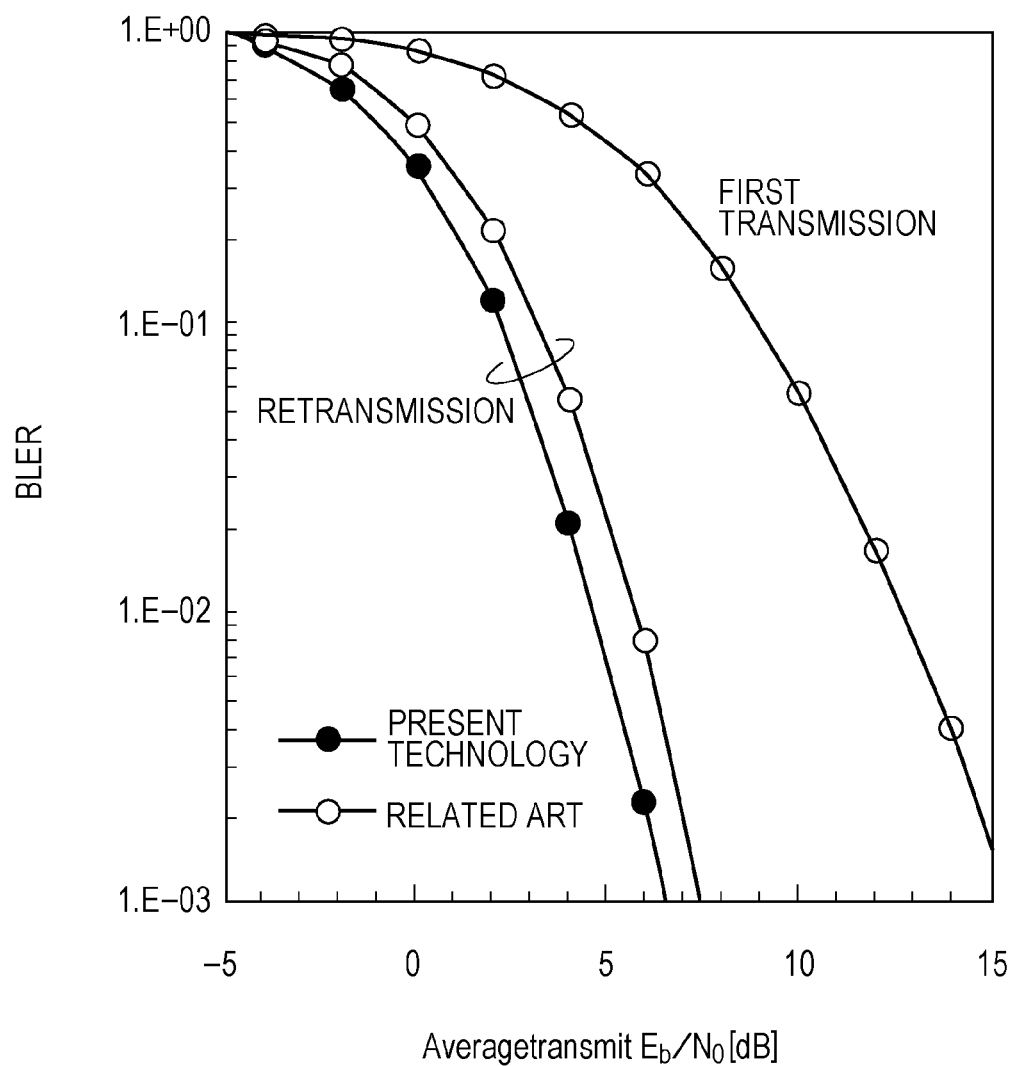
FIG. 7 is a schematic diagram illustrating a simulation result related to the present embodiment.

According to the present embodiment, this results in a communication system in which a spectrum having high energy that has been clipped during the first transmission opportunity may be retransmitted even though the spectrum having high energy has been clipped during the first transmission, for example. FIG. 7 illustrates a calculator simulation result. These results are the block error rate performance for the first transmission performance and the retransmission performance when an 8 RB (resource block, 1 RB equals 12 frequency points) single carrier is generated, and 2 RB of high frequencies are clipped. Conditions include QPSK with an coding rate of ½, the channel model includes a Typical Urban with 6 paths, an iterative equalization iteration count of 6, and a turbo decoding iteration count of 6, and it is assumed that RB scheduling is not performed, the channel estimation is ideally performed, and that there is no correlation between channel for the retransmission and the first transmission. It is understood from FIG. 7 that the present invention, which transmits a spectrum not transmitting at the first transmission during the retransmission, exhibits better error rate performance as compared to the related art, which transmits the same spectrum as that for the first transmission during the retransmission. According to the present embodiment, this is because the spectrum having high energy is not clipped also during the retransmission opportunity, and so the potential to be decoded correctly at the base station device b1 may be increased. According to the present embodiment, this results in the ability to increase the transmission efficiency regarding communication systems that perform retransmission control.

Second Embodiment

The following describes in detail the second Embodiment of the present invention with reference to the drawings.

According to the present embodiment, the description assumes the case when the communication system updates the number of points to be clipped depending on the number of retransmissions. According to the present embodiment, the mobile station device 1 in FIG. 1 is referred to as a mobile station device a2, and the base station device 2 is referred to as a base station device b2.

<About the Mobile Station Device a2>

Figure 8:
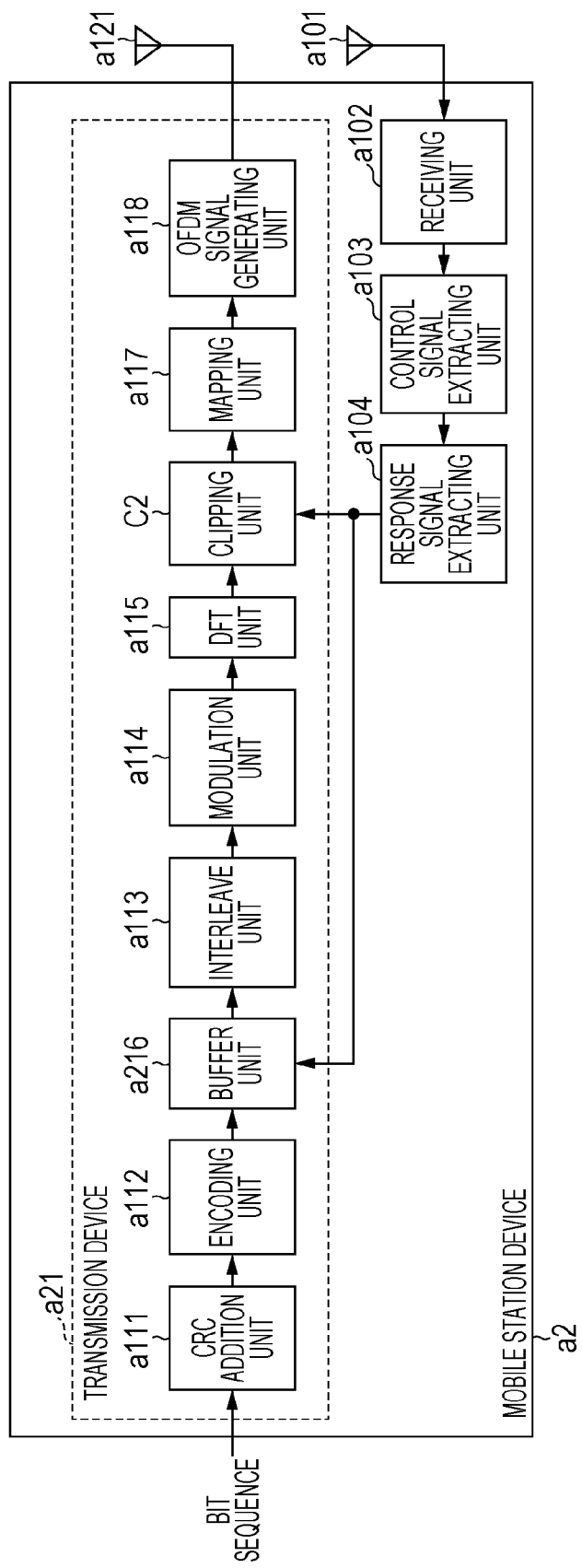
FIG. 8 is a schematic block diagram illustrating a configuration of a mobile station device related to a second Embodiment of the present invention.

FIG. 8 is a schematic block diagram illustration a configuration of the mobile station device a2 related to the second Embodiment of the present invention. The difference when comparing the mobile station device a2 related to the present embodiment (FIG. 8) and the mobile station device a1 related to the first Embodiment (FIG. 2) is a buffer unit a216 and a clipping unit C2. However, functions having other configuration elements are the same as those for the first Embodiment (the antenna a101, the receiving unit a102, the control signal extraction unit a103, the response signal extraction unit a104, the CRC addition unit a111, the encoding unit a112, the interleave unit a113, the modulation unit a114, the DFT unit a115, the mapping unit a117, the OFDM signal generating unit a118, and the antenna a121). The descriptions of the functions that are the same as those for the first Embodiment are omitted.

The buffer unit a216 stores the bit sequence input from the encoding unit a112 adding a sequence for each bit type. Specifically, according to an example in which an coding rate of ⅓ is the base code, the buffer unit a216 adds and stores a systematic bit (bit number is $N_{info}$) and two parity bits (parity bit 1, parity bit 2, the bit number for each is $N_{info}$).

The buffer unit a216 selects the bits to output from the stored bit sequences on the basis of the automatic retransmission request information (referred to as the bit selection processing). Further, the buffer unit a216 counts the number of retransmissions on the basis of the automatic retransmission request information, and may select the bits to output on the basis of the counted number of retransmissions. Also, the buffer unit a216 obtains the information representing the points to be clipped, which are determined by the clipping unit C2 described later, and may select the bits to output on the basis of the obtained information. Here, the information representing the points to be clipped may be information representing the number of points to be clipped, or may be a ratio of the number of points to be clipped (ratio of the number of points clipped during the first transmission opportunity, or the ratio of the number of points clipped during the previous transmission opportunity). Details on the bit selection processing performed by the buffer unit a216 will be described later.

The buffer unit a216 outputs the selected bits to the interleave unit a113. The clipping unit C2 determines the points to be clipped on the basis of the automatic retransmission request information (referred to as the point determination processing). The clipping unit C2 counts the number of retransmissions on the basis of the automatic retransmission request information, and may determine the points to be clipped on the basis of the counted number of retransmissions. Details on the point determination processing performed by the clipping unit C2 will be described later.

The clipping unit C2 clips the frequency spectrum for the determined points (clip processing). The clipping unit C2 outputs the frequency spectrum S'(m, n) to which clip processing has been performed to the mapping unit a117.

<Bit Selection Processing>

The following describes in detail the bit selection processing performed by the buffer unit a216. The buffer unit a216 stores output bit information to which a correspondence between the number of retransmissions and the bits to be output has been added.

FIG. 9 is a schematic diagram illustrating an example output bit information table related to the present embodiment. As illustrated in the figure, the output bit information table includes a systematic bit, a parity bit1, and a parity bit 2 for each item of the sequence, these bits functioning as the number of retransmissions and the output bit information.

FIG. 9 illustrates an example of when determination is made that the automatic retransmission request information represents an ACK, that is to say, when the number of retransmissions is r=0, the buffer unit a216 outputs the systematic bit, the parity bit 1, and the parity bit 2 for sequences numbered 1 through $N_{info}$, that is to say, all systematic bits, parity bits 1, and parity bits 2. Here, the buffer unit a216 outputs the bit sequence to be transmitted after the bit sequence previously output to the interleave unit a113.

Also, FIG. 9 illustrates an example of when L is an integer of at least zero, and so the number of retransmissions is r=2L+1 (for example, r=1, 3, . . . ), the buffer unit a216 outputs the parity bit 1 and the parity bit 2 for sequences numbered 1 through $N_{info}/2$, that is to say, the first half portion of the parity bits 1 and the parity bits 2. Also, FIG. 9 illustrates an example of when the number of retransmissions is r=2L+2 (for example, r=2, 4, . . . ), the buffer unit a216 outputs the parity bit 1 and the parity bit 2 for sequences numbered ($N_{info}/2$)+1 through $N_{info}$, that is to say, the second half portion of the parity bits 1 and the parity bits 2. Here, when the automatic retransmission request information is determined to represent the NAK, that is to say, when the number of retransmissions is r≥1, the buffer unit a216 outputs the bits generated from the same systematic bits and the two parity bits to the clipping unit C1. That is to say, the buffer unit a216 outputs the bits for retransmitting the bit sequence input into the transmitting device a21.

That is to say, the buffer unit a216 outputs a bit sequence with a number of bits at the retransmission opportunity that is smaller as compared to that of the first transmission opportunity. Also, the buffer unit a216 outputs parity bits at the retransmission opportunity that are different from the previously output parity bits. That is to say, for the retransmission opportunity, the buffer unit a216 gives priority to and outputs the parity bits not previously outputs over the parity bits that were previously output. As a result, the mobile station device a2 gives priority to and transmits the spectrum clipped at the previous transmission over the spectrum not clipped.

<Point Determination Processing>

When the automatic retransmission request information represents the ACK, the clipping unit C2 makes a determination to clip the frequency spectrum for the $N_{CLIP}$ points ($=N_{DFT}/4=N_{DFT}-N_{TX}$) having high frequencies from the $N_{DFT}$ points. Conversely, when the automatic retransmission request information represents the NAK, the clipping unit C2 makes a determination not to clip. Further, for the case of the NAK, the signal input into the clipping unit C2 from the DFT a115 is the signal to which the $N_{TX}$ point discrete Fourier transformation has been performed. That is to say, the clipping unit C2 compares the retransmission opportunity ($N_{CLIP}=0$) with the first transmission ($N_{CLIP}=N_{DFT}/4$) and decreases the points to be clipped.

<About the Clip Processing>

The following describes in detail the clip processing performed by the clipping unit C2.

FIG. 10 is a schematic diagram illustrating an example of the frequency spectrum S'(m, n) related to the present embodiment. This figure illustrates the frequency spectrum S'(m, n) output by the clipping unit C2. The horizontal axis in this figure represents frequency.

The frequency spectrum S'(m, n, r) on a solid line given the reference numeral of S'(m, n, r) in FIG. 10 (in FIG. 10, r equals 0 or at least 1) illustrates the frequency spectrum S'(m, n) for each r attempt regarding the number of retransmissions. Further, the frequency spectrum as a combination of the dotted line and the solid line represents the frequency spectrum S(m, n) input into the clipping unit C2.

FIG. 10 illustrates that the clipping unit C2 clips the frequency spectrum for the $N_{CLIP}$ number of points having high frequencies from the $N_{DFT}$ points during the first transmission opportunity. In this case, the clipping unit C2 outputs the frequency spectrum S'(m, 0) for the $N_{TX}$ number of points having high frequencies from the $N_{DFT}$ points to the mapping unit a117.

Also, FIG. 10 illustrates that the clipping unit C2 does not clip the frequency spectrum for the $N_{TX}$ points during the retransmission opportunity. In this case, the clipping unit C2 outputs the frequency spectrum S(m, n, r) (r≥1) for the $N_{TX}$ points input from the DFT unit a115 to the mapping unit a117 as it is.

When the ACK is input as the response signal, for example, as this indicates the transmission of a new packet, the mobile station device a2 transmits the signal which is clipped output from the DFT unit for the $N_{TX}$ points resulting in the $N_{TX}$ points ($=N_{DFT}-N_{CLIP}$) as illustrated in FIG. 10. Conversely, when the NAK is input, this indicates that the decoding has not been correctly performed at the base station device b2, and so the potential that the it will not be decoded correctly even if the mobile station device a2 transmits the clipped frequency spectrum during the retransmission. Thus, as illustrated in FIG. 10, the spectrum to which clipping has not been performed is transmitted at the retransmission.

Also, according to the communication system regarding the present embodiment, the clipping ratio for the first transmission opportunity is ¼, and the clipping ratio for the retransmission opportunity is zero, that is to say, the clipping is not performed, and so the transmission rate during the retransmission is ¾ as that of the first transmission. During the first opportunity, the total of 2 $N_{info}$ systematic bits and parity bits are transmitted, but during the retransmission, only 3 $N_{info}/2$ bits are transmitted.

<Modification 1>

FIG. 11 is a schematic diagram illustrating an example of the output bit information table related to a modification 1 of the present embodiment. As illustrated in the figure, the output bit information table includes a systematic bit, a parity bit1, and a parity bit 2 for each item of the sequence, these bits functioning as the number of retransmissions and the output bit information.

FIG. 11 illustrates an example of when the number of retransmissions is r=0, the buffer unit a216 outputs the systematic bit for sequences numbered 1 through $N_{info}$, and the parity bit 1 and the parity bit 2 for the sequences numbered 1 through $N_{info}/2$. Here, the buffer unit a216 outputs the bits to be transmitted after the bits previously output to the interleave unit a113.

Also, FIG. 9 illustrates an example of when the number of retransmissions is r=2L+1, the buffer unit a216 outputs the systematic bits numbered 1 through $N_{info}/2$, and the parity bit 1 and the parity bit 2 numbered $N_{info}/2+1$ through $N_{info}$. Here, in the event that the number of retransmissions is r≥1, the buffer unit a216 outputs the bits generated from the same systematic bits and the two parity bits to the clipping unit C1.

FIG. 12 is a schematic diagram illustrating the bits output by the encoding unit a112 and the buffer unit a216 related to the modification 1 of the present embodiment. This figure illustrates the bits output by the encoding unit a112 and the buffer unit a216 for the cases in the output bit information table of FIG. 11.

The information bits B11 given the reference numeral B11 in FIG. 12 is the bit sequence input into the encoding unit a112. This bit sequence has a bit count of the $N_{info}$ bit sequence. The systematic bit given the reference numeral B121, the parity bit 1 given the reference numeral B122, and the parity bit 2 given the reference numeral B123 in this figure are the bit sequences of the information bits B11 encoded and output by the encoding unit a112. These bit sequences have bit counts of the $N_{info}$ bit sequence, and a total bit count of the 3 $N_{info}$ bit sequence.

The systematic bit given the reference numeral B131, the parity bit 1 given the reference numeral B132, and the parity bit 2 given the reference numeral B133 in FIG. 12 represent the bits output by the buffer unit a216 during the first transmission opportunity (r=0). Here, the bit count of the systematic bits is $N_{info}$, and the bit counts of the parity bits 1 and the parity bits 2 is $N_{info}/2$. The systematic bit given the reference numeral B141, the parity bit 1 given the reference numeral B142, and the parity bit 2 given the reference numeral B143 in this figure represent the bits output by the buffer unit a216 during the retransmission opportunity (r=1). Here, the bit count of the systematic bits, the parity bits 1, and the parity bits 2 are $N_{info}/2$. Also, the parity bits 1 and 2 output by the buffer unit a216 at the first retransmission opportunity are different from those for the first retransmission opportunity (previous attempt).

The systematic bit given the reference numeral B151, the parity bit 1 given the reference numeral B152, and the parity bit 2 given the reference numeral B153 in FIG. 12 represent the bits output by the buffer unit a216 during the second retransmission opportunity (r=2). Here, the bit count of the systematic bits and the parity bits 1 and the parity bits 2 are $N_{info}/2$. Also, the parity bits 1 and 2 output by the buffer unit a216 at the second retransmission opportunity are different than those for the first retransmission opportunity (previous attempt). Further, the horizontal axis in FIG. 12 represents not only the bit sequence, but may also represent the amount. For example, during the first transmission (r=0), instead of transmitting only the first half of the parity bits 1 and the parity bits 2 generated by the encoding unit a112, half of the average of all parity bits 1 and parity bits 2 may be transmitted. This is achieved by performing an interleave of the party bits 1 and the parity bits 2 generated as the coded bits.

<About the Base Station Device b2>

Figure 13:
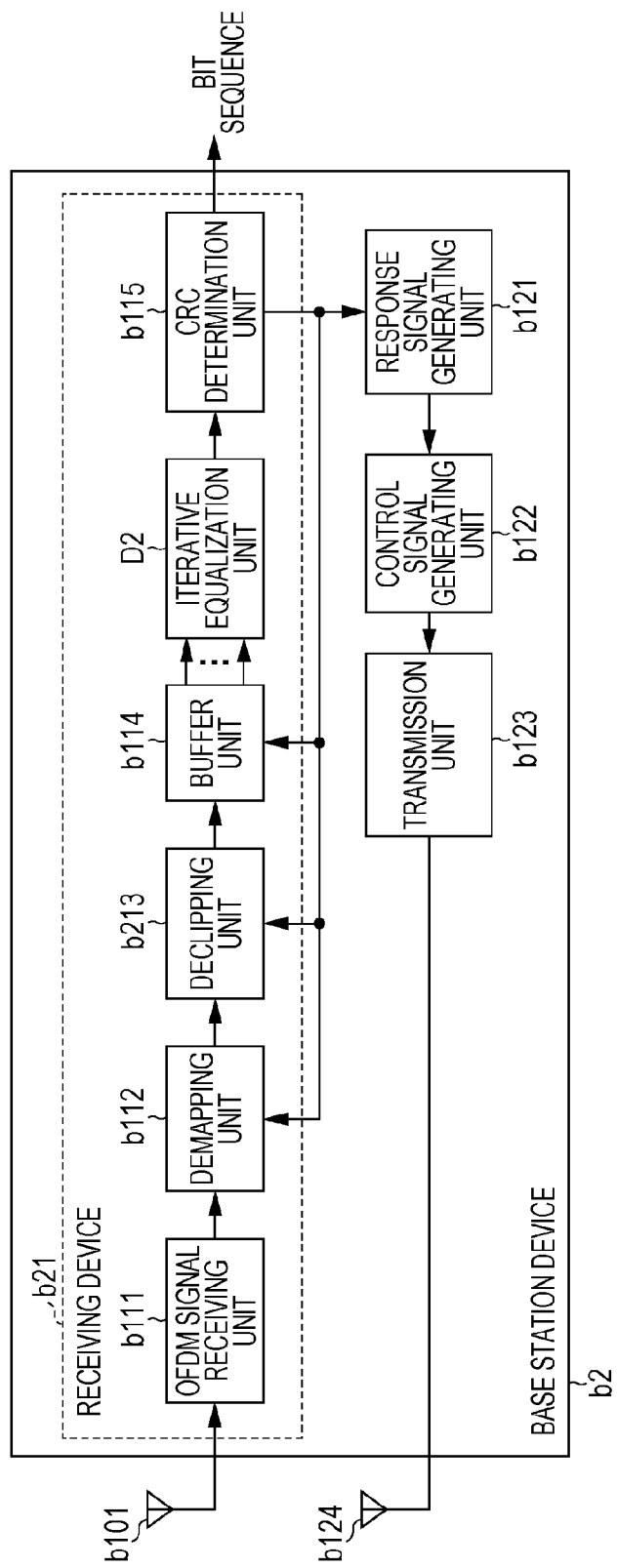
FIG. 13 is a schematic block diagram illustrating a configuration of a base station device related to the present embodiment.

FIG. 13 is a schematic block diagram illustrating a configuration of the base station device b2 related to the present embodiment. The difference when comparing the base station device b2 related to the present embodiment (FIG. 13) and the base station device b1 related to the first Embodiment (FIG. 5) is a de-clipping unit b213 and an iterative equalization unit D2. However, functions having other configuration elements are the same as those for the first Embodiment (the antenna b101, the OFDM signal receiving unit b1ll, the demapping unit b112, the buffer unit b114, the CRC determination unit b115, the response signal generating unit b121, the control signal generating unit b122, the transmitting unit b123, and the antenna b124). The descriptions of the functions that are the same as those for the first Embodiment are omitted.

The de-clipping unit b213 adds zeroes to the $N_{CLIP}$ points portion of the frequency spectrum input from the demapping unit b112 clipped by the mobile station device a2 on the basis of the CRC determination result information input from the CRC determination unit b115. Here, the de-clipping unit b213 calculates the number of retransmissions on the basis of the CRC determination result information, and updates the points to be clipped depending on the calculated number of retransmissions.

Specifically, when the number of retransmissions is r=0, the de-clipping unit b213 generates the frequency spectrum for the $N_{DFT}$ points by inserting zeroes for the $N_{CLIP}$ points in the $N_{TX}$ point frequency spectrum. In this case, the de-clipping unit b213 outputs the generated frequency spectrum to the buffer unit b114.

Conversely, when the number of retransmissions is r≥1, the de-clipping unit b213 does not insert zeroes into the $N_{TX}$ point frequency spectrum, and outputs the $N_{TX}$ point frequency spectrum to the buffer unit b114 as it is. In this way, the de-clipping unit b213 inputs the spectrum having different bandwidths at the transmission opportunities into the buffer unit b114.

Figure 14:
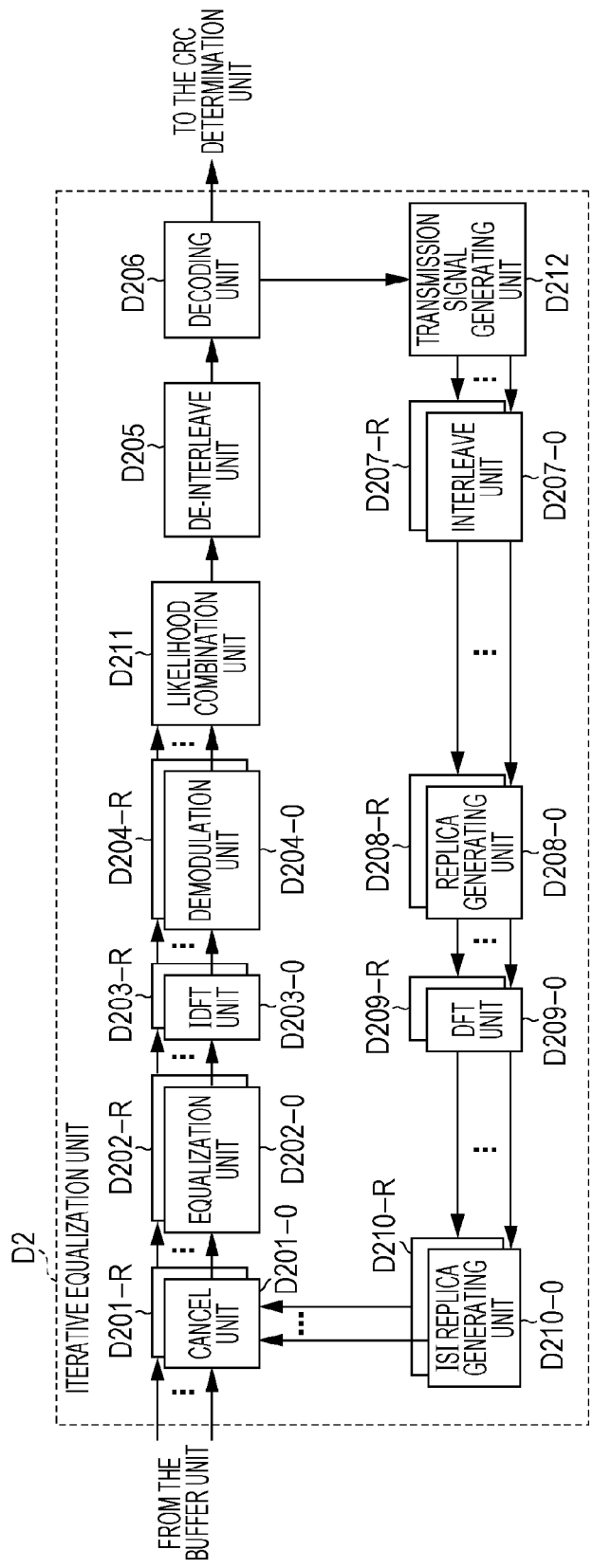
FIG. 14 is a schematic block diagram illustrating a configuration of an iterative equalization unit related to the present embodiment.

FIG. 14 is a schematic block diagram illustrating a configuration of the iterative equalization unit D2 related to the present embodiment. The configuration in this figure includes cancel units D201-0 through D201-R, equalization units D202-0 through D202-R, IDFT units 203-0 through D203-R, demodulation units D204-0 through D204-R, a likelihood combination unit D211, a deinterleave unit D205, a decoding unit D206, a transmit signal generating unit D212, interleave units D207-0 through D207-R, replica generating units D208-0 through D208-R, DFT units D209-0 through D209-

R, and ISI replica generating units D210-0 through D210-R. Further, this figure illustrates the configuration of the iterative equalization unit D2 when a signal is received when the count result of the CRC determination unit b115 is R, that is to say, when the signal for the R attempt regarding the number of retransmissions is received.

The cancel unit D201-$r$ (0≤r≤R) stores the frequency spectrum for the retransmission opportunity at the r attempt input from the buffer unit b114. Also, the cancel unit D201-$r$ receives, from a later-described ISI replica generating unit D201-$r$, input of the ISI replica corresponding to the frequency spectrum for the retransmission opportunity at the r attempt. The cancel unit D201-$r$ subtracts the corresponding ISI replica from the stored frequency spectrum for the retransmission opportunity at the r attempt.

Further, for the first process of iterative processing, that is to say, when the newly transmitted frequency spectrum is input from the buffer unit b114, there is no input from the ISI replica generating units D210-0 through D210-R, so the cancel unit D201-0 through D201-R outputs the input frequency spectrum to the equalization unit D202-0 through D202-R, respectively.

The uplink channel estimation value for the retransmission opportunity at the r attempt, which is estimated by the channel estimating unit (not illustrated) using the pilot signal, is input into the equalization unit D202-$r$. The equalization unit D202-$r$ equalizes the frequency spectrum for the retransmission opportunity at the r attempt input from the cancel unit D201-$r$ using the channel estimation value. The equalization unit D202-$r$ outputs the equalized frequency spectrum for the retransmission opportunity at the r attempt to the IDFT unit D203-$r$.

The IDFT unit D203-$r$ transforms the frequency spectrum input from the equalization unit D202-$r$ from a frequency spectrum that is a frequency domain signal to a time domain signal by performing inverse discrete Fourier transformation of the $N_{DFT}$ points. The IDFT unit D203-$r$ outputs the transformed signal to the demodulation unit D204-$r$.

The demodulation unit D204-$r$ calculates the bit LLR (log likelihood ratio) for the retransmission opportunity at the r attempt using the modulation method information notified to the mobile station device a2 by the base station device b2 and the signal input from the IDFT unit D203-$r$. The demodulation unit D204-$r$ outputs the bit sequence of the calculated bit LLR to the likelihood combination unit D211.

The likelihood combination unit D211 stores the output bit information table. Based on the output bit information table, the likelihood combination unit D211 combines bit sequences input from the decoding units D204-0 through D204-N. Specifically, the likelihood combination unit D211 combines by LLR bits of which the sequence is the same as bits indicated by the output bit information, and arrays according to that sequence.

An example when R=1 in the case of modification 1 (output bit information table in FIG. 11) will be described to illustrate. In this case, the bit sequence for the first transmission opportunity from the demodulation unit D204-0, that is to say, the sequence of systematic bits numbered 1 through $N_{info}$ and the sequence of parity bits 1 and 2 numbered 1 through $N_{info}/2$, are input into the likelihood combination unit D211. Also, the bit sequence for the first retransmission opportunity from the demodulation unit D204-1, that is to say, the sequence of systematic bits numbered 1 through $N_{info}/2$ and the sequence of parity bits 1 and 2 numbered $N_{info}/2+1$ through $N_{info}$, are input into the likelihood combination unit D211.

Regarding the sequence of systematic bits numbered 1 through $N_{info}/2$, the likelihood combination unit D211 designates the combination (addition) of the LLR of the systematic bits for the first transmission opportunity and the first retransmission opportunity as the LLR of the systematic bits. Regarding the sequence of systematic bits numbered $N_{info}/2+1$ through $N_{info}$, the likelihood combination unit D211 designates the bit sequence (of the first transmission opportunity) input from the demodulation unit D204-0 as the systematic bits. The likelihood combination unit D211 arranges the combined systematic bits in this sequence. Similarly, the likelihood combination unit D211 arranges the combination of the parity bits 1 and 2 in sequence.

The likelihood combination unit D211 outputs the arrange bit sequence to the deinterleave unit D205.

The deinterleave unit D205 performs a sequencing of the bit sequence input from the likelihood combination unit D211 opposite to that of the sequencing performed by the interleave unit a113, that is to say, a sequencing to return to the original sequence. The deinterleave unit D205 outputs the bit sequence to which the sequencing has been performed to the decoding unit D206.

The decoding unit D206 counts the number of times the bit sequence from the deinterleave unit D205 was input. When the number of times counted is over a predetermined number of times, the decoding unit D206 performs error correction decoding on the basis of the coding rate represented by the coding information notified to the mobile station device a2 by the base station device b2. In this case, the decoding unit D206 outputs the bit sequence obtained by a hard determination of the LLR of the information bits obtained by the decoding, to the CRC determination unit b115. Also, when the number of times counted is at most the predetermined number of times, the decoding unit D206 outputs the LLR of the coded bit sequence to which the error correction decoding has been performed, to the transmit signal generating unit D212.

The transmit signal generating unit D212 stores the output bit information table. The transmit signal generating unit D212 generates a bit sequence corresponding to the bit sequence output by the buffer unit a216 for each transmission opportunity from the bit sequence input from the decoding unit D206 on the basis of the output bit information table. Specifically, for each retransmission attempt r (including when r=0), a processing is performed that is similar to the processing performed by the previously described buffer unit a216. The transmit signal generating unit D212 outputs the bit sequence generated as the bit sequence for the first transmission opportunity to the interleave unit D207-0, and outputs the bit sequence generated as the bit sequence for retransmission opportunity attempts 1 through R to the interleave units D207-1 through D207-R, respectively.

The interleave unit D207-$r$ performs a sequencing that is the same as the sequencing performed by the interleave unit a113 on the bit sequence input from the transmit signal generating unit D212. The interleave unit D207-$r$ outputs the bit sequence to which the sequencing has been performed to the replica generating unit D208-$r$.

The replica generating unit D208-$r$ generates a soft determination replica for the bit sequence input from the interleave unit D207-$r$ by modulation based on the modulation method information notified to the mobile station device a2 by the base station device b2. The replica generating unit D208-$r$ outputs the generated soft determination replica to the DFT unit D209-$r$.

The DFT unit D209-$r$ performs discrete Fourier transformations for the $N_{DFT}$ points on the soft determination replica input from the replica generating unit D208-$r$ for each $N_{DFT}$ number of modulation symbols. The DFT unit D209-r outputs the transformed signal (frequency spectrum) to the ISI replica generating unit D210-r.

The ISI replica generating unit D210-r stores the clip information to which a correspondence with the points to be clipped from the frequency spectrum has been added for each transmission opportunity. The ISI replica generating unit D210-r clips the frequency spectrum points represented by the stored clip information from the frequency spectrum input from the DFT unit D209-r.

The uplink channel estimation value for each transmission opportunity from the channel estimating unit (not illustrated) is input into the ISI replica generating unit D210-r. The ISI replica generating unit D210-r generates the ISI replica for each transmission opportunity on the basis of the input channel estimation value. The ISI replica generating unit D210-r outputs the generated ISI replica to the cancel unit D201-r.

According to the present embodiment, when the signal for the first transmission opportunity may not be correctly decoded by the iterative equalization in this way, the mobile station device a2 decreases the amount of clipping performed during retransmission. As a result, ISI may be decreased during the retransmission opportunity as compared to the first transmission opportunity in the communication system, and so the potential that the decoding is correct at the retransmission opportunity may be increased. That is to say, according to the present embodiment, transmission efficiency may be increased in communication systems that perform retransmission control.

Also, as clipping continues to be performed in the communication system, the PAPR (peak to average power ratio) increases for the transmitting signal as compared to when clipping is not performed. For this reason, amplifiers in the OFDM signal generating unit must suppress the transmitting power to transmit. According to the present embodiment, the mobile station device a2 performs transmission after decreasing the clipping amount during retransmission, and so the PAPR is improved. As a result, transmission in which the transmitting power is increased during retransmission may also be performed.

Further, according to the present embodiment, the same frequencies as for the first transmission opportunity were allocated for the retransmission opportunity for the sake of the description, but the frequency allocation may be different for the retransmission opportunity.

Third Embodiment

The following describes in detail the third Embodiment of the present invention with reference to the drawings.

According to the present embodiment, the description assumes a case when the communication system performs MIMO transmission. According to the communication system related to the present embodiment, the description assumes a case when the transmitting device has multiple antennas and transmits multiple streams (also referred to as layers or links) at the same timing and the same frequency. According to the present embodiment, the mobile station device 1 in FIG. 1 is referred to as a mobile station device a3, and the base station device 2 is referred as a base station device b3.

<About the Mobile Station Device a3>

Figure 15:
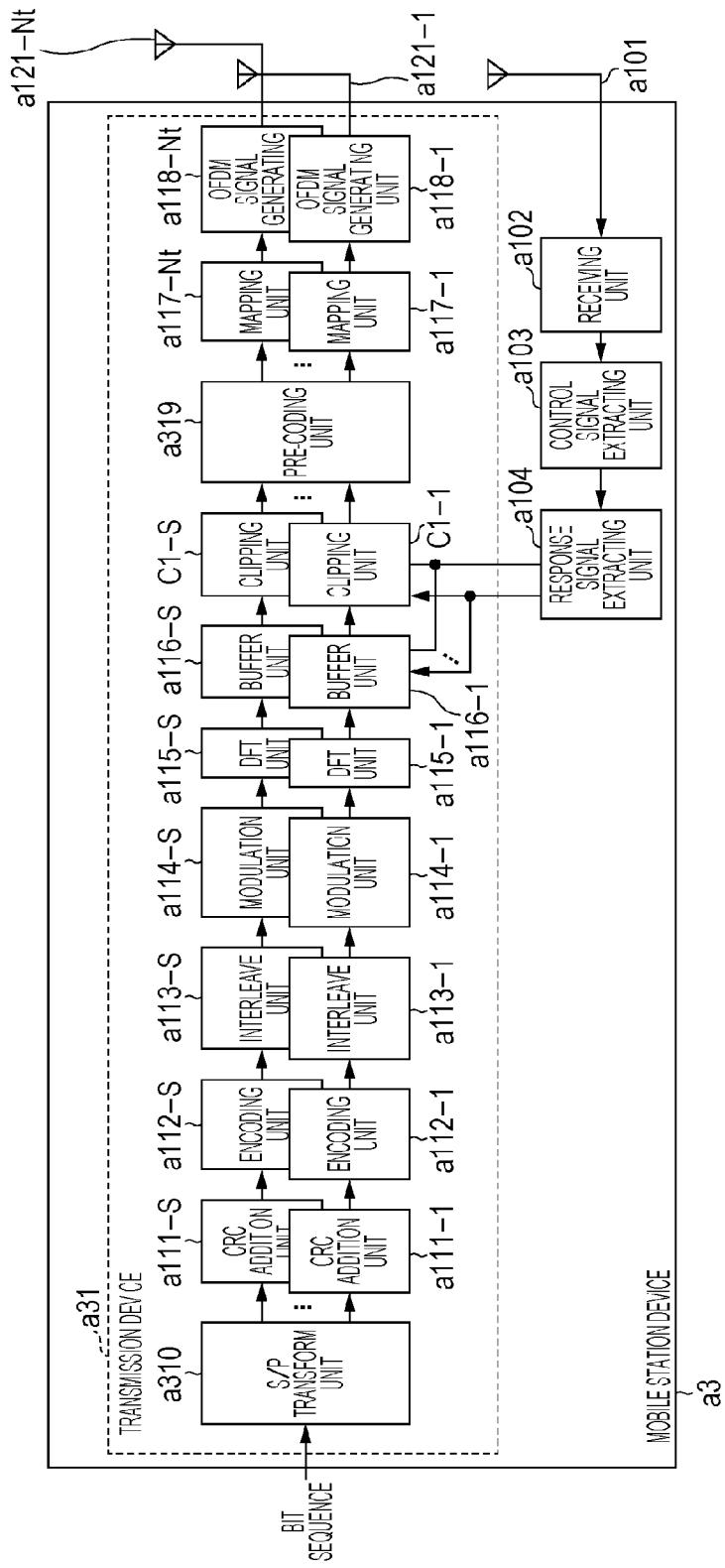
FIG. 15 is a schematic block diagram illustrating a configuration of a base station device related to a third Embodiment of the present invention.

FIG. 15 is a schematic block diagram illustrating a configuration of the mobile station device a3 related to the third Embodiment of the present invention. The mobile station device a3 in this figure transmits signals of an S number of streams using an Nt number of antennas. The mobile station device a3 is configured with the antenna a101, the receiving unit a102, the control signal extraction unit a103, the response signal extraction unit a104, and a transmitting device a31. The transmitting device a31 is configured with an S/P (serial to parallel) conversion unit a310, CRC addition units a111-1 through a111-S, encoding units a112-1 through a112-S, interleave units a113-1 through a113-S, modulation units a114-1 through a114-S, DFT units a115-1 through a115-S, buffer units a116-1 through a116-S, clipping units C1-1 through C1-S, a pre-coding unit a319, mapping units a117-1 through a117-Nt, OFDM signal generating units a118-1 through a118-Nt, and antennas a121-1 through a121-Nt. Also, the mobile station device a3 is provisioned with other well-known, general functions of a mobile station device.

Further, the antenna a101, the receiving unit a102, the control signal extraction unit a103, and the response signal extraction unit a104 have the same functions as those for the first Embodiment, and so their descriptions are omitted. However, the response signal extraction unit a104 extracts the automatic retransmission request information for each of the s number of streams (the s number of streams is an integer equal to 1≤s≤S). The response signal extraction unit a104 outputs the extracted automatic retransmission request information for the s number of streams to the buffer unit a115-s and the clipping unit C1-s.

Also, when comparing the present embodiment and the first Embodiment, the CRC addition unit a111-s has the same function as the CRC addition unit a111, the encoding unit a112-s as the encoding unit a112, the interleave unit a113-s as the interleave unit a113, the modulation unit a114-s as the modulation unit a114, the DFT unit a115-s as the DFT unit a115, the buffer unit a116-s as the buffer unit a116, and the clipping unit C1-s as the clipping unit C1, so their descriptions are omitted. Also, the mapping unit a117-t (t is an integer equal to 1≤t≤Nt) has the same function as the mapping unit a117, the OFDM signal generating unit a1184 has the same function as the OFDM signal generating unit a118, and the antenna a121-t has the same function as the antenna a121, and so their descriptions are omitted.

A bit sequence of the data transmitted to the mobile station device a3 is input into the S/P conversion unit a310. The S/P conversion unit a310 generates the S number of bit sequences by serial-to-parallel conversion of the input bit sequence. The S/P conversion unit a310 outputs, of the generated bit sequence, the s number bit sequence to the CRC addition unit a111-s.

A frequency spectrum S'(m, n, s) from the clipping unit C1-s is input into the pre-coding unit a319. Here, the frequency spectrum S'(m, n, s) represents the frequency spectrum S'(m, n) for the s number stream.

The pre-coding unit a319 stores a pre-coding matrix of Nt rows and S columns, and multiplies the stored pre-coding matrix with a vector making up a component of the frequency spectrum S'(m, n, s) for each s number. The pre-coding unit a319 outputs a signal P(t) after multiplication to the mapping unit a117-t. To illustrate using an example when Nt=4 and S=3, the signal P(t) is expressed by the following expression (1).

[Math 1]

$$\begin{bmatrix} P(1) \\ P(2) \\ P(3) \\ P(4) \end{bmatrix} = \begin{bmatrix} 1 & 0 & 0 \\ 0 & 1 & 0 \\ -1 & 0 & 0 \\ 0 & 0 & 1 \end{bmatrix} \begin{bmatrix} S(m, n, 1) \\ S(m, n, 2) \\ S(m, n, 3) \end{bmatrix} = \begin{bmatrix} S(m, n, 1) \\ S(m, n, 2) \\ -S(m, n, 1) \\ S(m, n, 3) \end{bmatrix} \quad (1)$$

Figure 16:
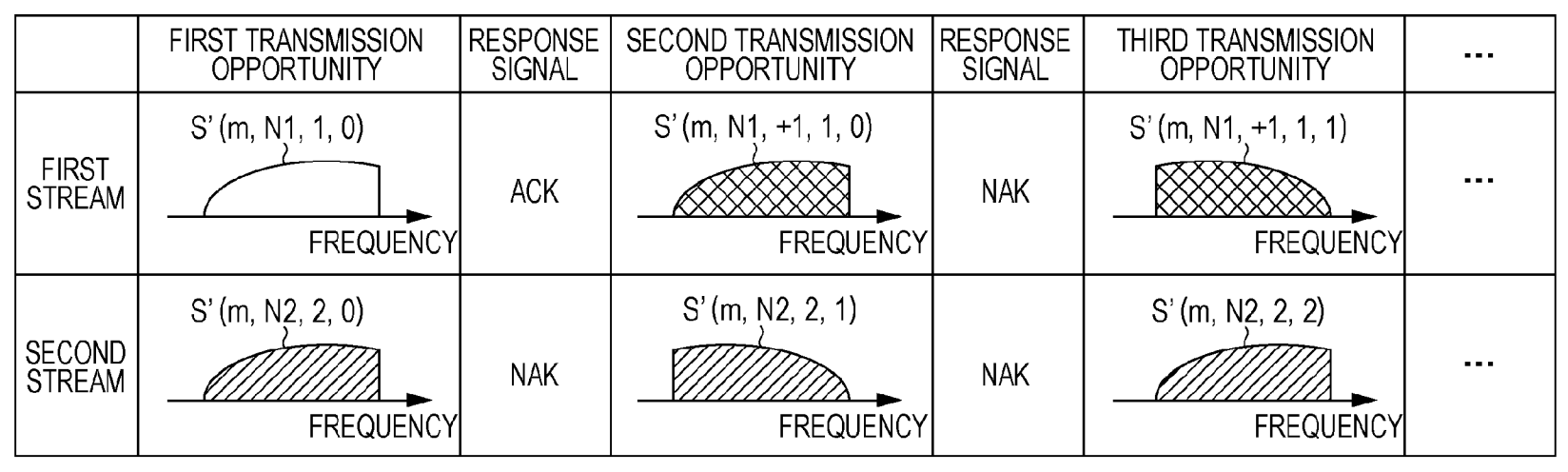

With the previously described configuration, the mobile station device a3 transmits the signal in FIG. 16 as an example.

FIG. 16 is a schematic diagram illustrating an example of the frequency spectrum S'(m, n, s) related to the present embodiment. This figure illustrates the frequency spectrum S'(m, n, s) when S=2. Rows in this figure represent streams, and columns represent transmission opportunities and response signal corresponding to these transmissions (automatic retransmission request information). Further, the columns are arranged in time order.

A frequency spectrum S'(m, n, s, r) on the solid line given the reference numeral S'(m, n, s, r) (in FIG. 16, n=N1, N2, s=1, 2, r=0, 1, 2) in FIG. 16 represents the frequency spectrum S'(m, n, s) for r attempt regarding the number of retransmissions. The horizontal axis in the figure representing the frequency spectrum S'(m, n, s, r) represents frequency. Also, the frequency spectrum S'(m, n, s) with a different hatching pattern in this figure represents different data to be transmitted (coded bit sequence, packet).

The $N_{CLIP}$ number of points having high frequencies from the $N_{DFT}$ points, that is to say, the high frequency frequency spectra are clipped for the frequency spectra S'(m, N1, 1, 0), S'(m, N2, 2, 0), S'(m, N1+1, 1, 0), and S'(m, N2, 2, 2) in FIG. 16. Conversely, the $N_{CLIP}$ number of points having low frequencies from the $N_{DFT}$ points, that is to say, the low frequency spectra are clipped for the frequency spectra S'(m, N1+1, 1, 1), S'(m, N2, 2, 1), S'(m, N2, 2, 2).

The first row in FIG. 16 represents that, regarding the first stream (first stream), the frequency spectrum S'(m, N1, 1, 0) for the first transmission opportunity is transmitted, and the ACK is returned to the mobile station device a3 as the response. Also, the first row represents that the frequency spectrum S'(m, N1, 1, 0) of the next packet for the second transmission opportunity is transmitted, and the NAK is returned to the mobile station device a3 as the response. Also, the first row represents that in response to the NAK, the frequency spectrum S'(m, N1, 1, 1), which is the frequency spectrum of the same sequence as that for the second transmission opportunity but with different clip processing having been performed, is retransmitted for the third transmission opportunity.

In FIG. 16, the second row represents that, regarding the second stream (second stream), the frequency spectrum S'(m, N2, 1, 0) for the first transmission opportunity is transmitted, and the NAK is returned to the mobile station device a3 as the response. Also, the first row represents that in response to the NAK, the frequency spectrum S'(m, N1, 1, 1), which is the frequency spectrum of the same sequence as that for the first transmission opportunity but with different clip processing as that of the first transmission opportunity having been performed, is retransmitted for the second transmission opportunity. Also, the first row represents that the NAK is returned to the mobile station device a3 as the response to the transmission for the second transmission opportunity. Also, the first row represents that in response to the NAK, the frequency spectrum S'(m, N1, 1, 2), which is the frequency spectrum of the same sequence as that for the second transmission opportunity but with different clip processing from that for the second transmission opportunity having been performed, is retransmitted for the third transmission opportunity.

According to the present embodiment, in this way there are cases when different clipping may be performed for each stream.

<About the Base Station Device b3>

Figure 17:
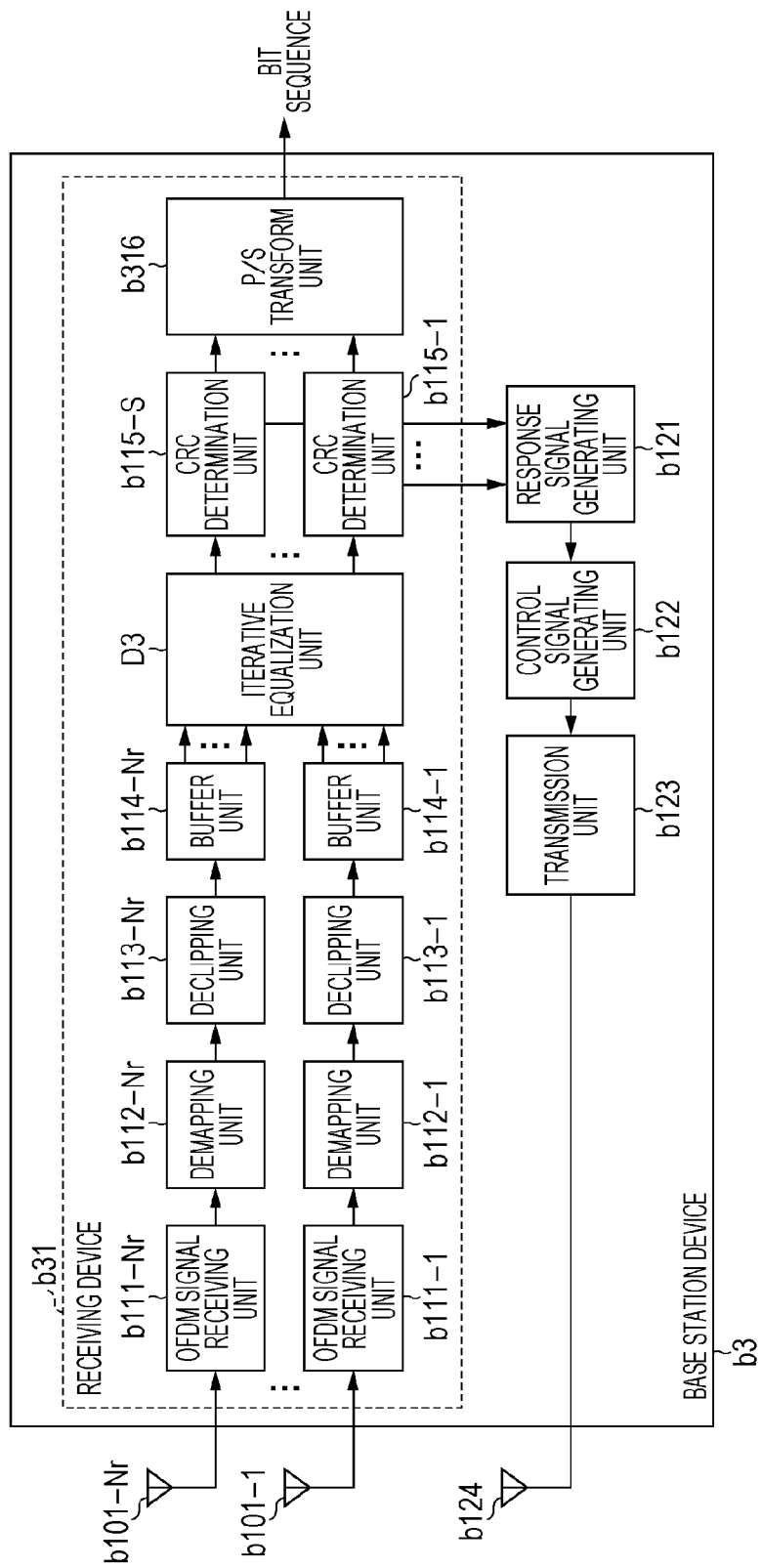
FIG. 17 is a schematic block diagram illustrating a configuration of a mobile station device related to the present embodiment.

FIG. 17 is a schematic block diagram illustrating a configuration of the base station device b3 related to the present embodiment. The base station device b3 in this figure transmits a signal of an S number of streams using an Nr number of antennas.

The base station device b3 is this figure is configured with antennas b101-1 through b101-Nr, a receiving device b31, the response signal generating unit b121, the control signal generating unit b122, the transmitting unit b123, and the antenna b124. The receiving device b31 is configured with OFDM signal receiving units b111-1 through b111-Nr, demapping units b112-1 through b112-Nr, declipping units b113-1 through b113-Nr, buffer units b114-1 through b114-Nr, an iterative equalization unit D3, CRC determination units b115-1 through b115-S, and a P/S (parallel to serial) conversion unit b316. Also, the base station device b3 is provisioned with other well-known, general functions of a base station device.

Further, the response generating unit b121, the control signal generating unit b122, the transmitting unit b123, and the antenna b124 have the same functions as those of the first Embodiment, and so their descriptions are omitted. However, the response signal generating unit b121 generates the automatic retransmission request information for the s number stream on the basis of the CRC determination result information for the number stream input from the CRC determination unit b115-s. The control signal generating unit b122 generates control information including the automatic retransmission request information for each s number stream.

Also, when comparing the present embodiment and the first Embodiment, the OFDM signal receiving unit b111-I (I is an integer equal to (1≤I≤Nr) has the same function as the OFDM signal receiving unit b111, the demapping unit b112-I has the same function as the demapping unit b112, the declipping unit b113-I has the same function as the declipping unit b113, the buffer unit b114-I has the same function as the buffer unit b114, and the CRC determination unit b115-s has the same function as the CRC determination unit b115, and so their descriptions are omitted.

The iterative equalization unit D3 performs processing for decoding the frequency spectrum input from the buffer unit b114-I (spectrum clipped by the mobile station device a3), performs MIMO division, and generates the bit sequence for the s number stream (iterative equalization processing). Further, details on the iterative equalization processing performed by the iterative equalization unit D3 will be described later. The iterative equalization unit D3 outputs the generated bit sequence for the s number stream to the CRC determination unit b115-s.

The P/S conversion unit b316 generates a bit sequence by performing a parallel-to-serial conversion on the s number bit sequences input from the CRC determination unit b115-1 through b115-S. The P/S conversion unit b316 outputs the generated sequence.

Figure 18:
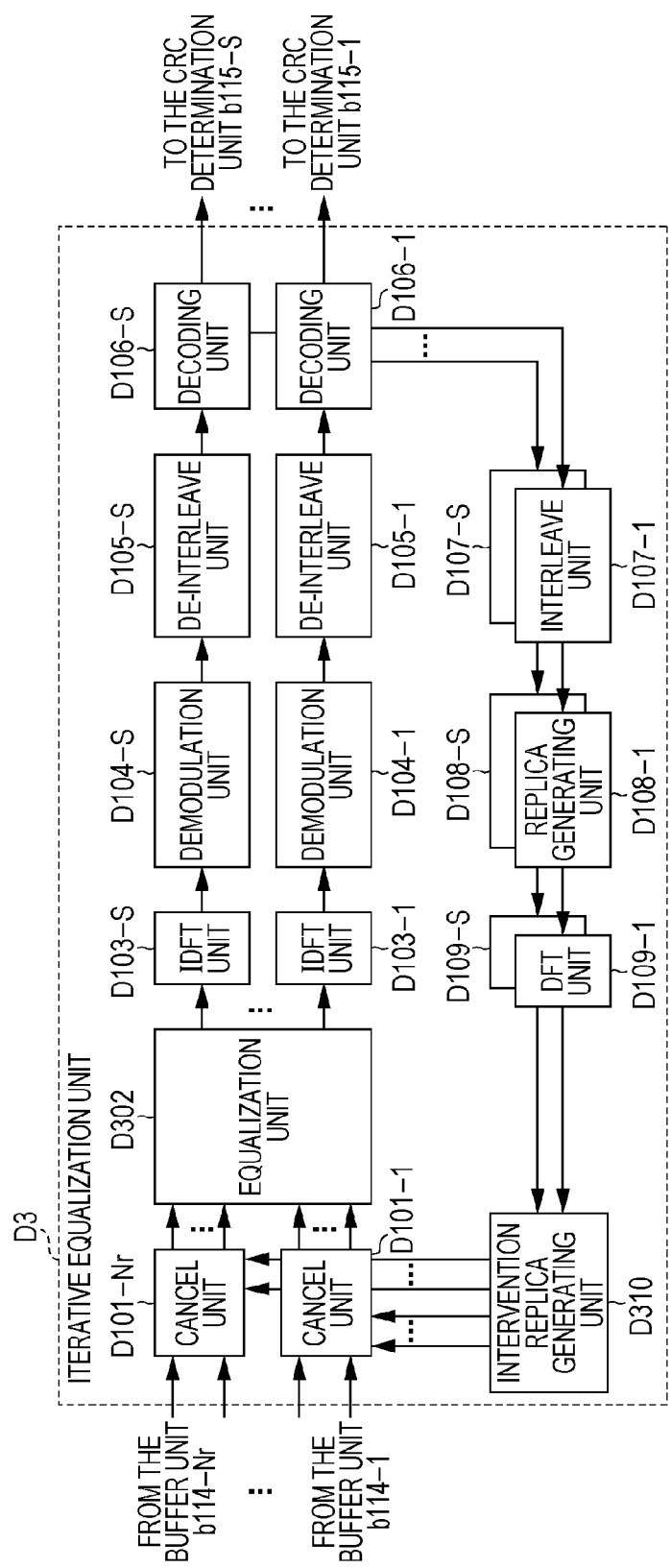
FIG. 18 is a schematic block diagram illustrating a configuration of an iterative equalization unit related to the present embodiment.

FIG. 18 is a schematic block diagram illustrating a configuration of the iterative equalization unit D2 related to the present embodiment. The configuration in this figure includes cancel units D101-1 through D101-Nr, an equalization unit D302, IDFT units D103-1 through D103-S, demodulation units D104-1 through D104-S, de-interleave units D105-1 through D105-S, decoding units D106-1 through D106-S, interleave units D107-1 through D107-S, replica generating units D108-1 through D108-S, DFT units D109-1 through D109-S, and an interference replica generating unit D310.

When comparing the present embodiment with the first Embodiment, the cancel unit D101-I has the same function as the cancel unit D101, the IDFT unit D103-s has the same function as the IDFT unit D103, the demodulation unit D104-s has the same function as the demodulation unit D104, the de-interleave unit D105-s has the same function as the de-interleave unit D105, the decoding unit D106-s has the same function as the decoding unit D106, the interleave unit D107-s has the same function as the interleave unit D107, the replica generating unit D108-s has the same function as the replica generating unit D108, and the DFT unit D109-s has the same function as the DFT unit D109, and so their descriptions are omitted. However, the ISI replica and an IAI replica for each transmission opportunity from the antenna b101-I is input into the cancel unit D101-I. The cancel unit D101-I subtracts the ISI replica and the IAI replica for each transmission opportunity from the antenna b101-I from the frequency spectrum for each transmission opportunity input from the buffer unit b114-I.

The uplink channel estimation value (channel matrix) estimated by the channel estimating unit (not illustrated) using the pilot signal is input into the equalization unit D302. Further, the channel estimation value is estimated by multiplying the channel matrix between the original antennas with the pre-coding matrix for expression (1). Further, zeroes are inserted into the channel estimation value regarding frequencies clipped by the transmitting device. The equalization unit D302 performs MIMO dividing and equalizes the frequency spectrum for each transmission opportunity input from the cancel unit D101-1 through D101-Nr using an inverse matrix of the channel matrix, and generates the frequency spectrum for each stream. At each transmission opportunity, the equalization unit D302 combines the equalized frequency spectra for each transmission opportunity. The generated frequency spectrum for each s number stream is output to the IDFT unit D103-s.

The interference replica generating unit D310 stores the clip information to which a correspondence between the number of retransmissions and the points to be clipped from the frequency spectrum added for each stream. Specifically, according to the clip information in the case of the example in FIG. 14, a correspondence is added to the information representing that r=0 (first transmission) and the number of $N_{CLIP}$ points having high frequencies from the $N_{DFT}$ points for the first stream and the second stream, and a correspondence is added to the information representing that r≥1 and the $N_{CLIP}$ number of points having low frequencies from the $N_{DFT}$ points.

The interference replica generating unit D310 generates the current number of retransmissions and adds a correspondence with the number of retransmissions to the same frequency spectrum as the frequency spectrum input from the each of the DFT units D109-s. The interference replica generating unit D310 clips the frequency spectrum for the points to which the correspondence has been added by the stored clip information from the frequency spectrum to which the correspondence has been added for each s number stream and retransmission opportunity. As a result, for the frequency spectrum to which a correspondence with the number of transmissions being r=0 has been added for each stream, for example, the frequency spectrum for the $N_{CLIP}$ number of points having high frequencies is clipped, and for the frequency spectrum to which the correspondence with the number of retransmissions being r≥1 has been added, the frequency spectrum for the $N_{CLIP}$ number of points having low frequencies is clipped.

The interference replica generating unit D310 stores the pre-coding matrix for the Nt rows and S columns of expression (1), and multiples the stored pre-coding matrix with the vector making up the components of the clipped frequency spectrum for each s number. The interference replica generating unit D310 generates ISI components and inter-antenna interference (IAI, Inter-Antenna Interference) components for the frequency spectrum to which the pre-coding matrix has been multiplied using the uplink channel estimation value (channel matrix) input from the channel estimating unit (not illustrated). As a result, the interference replica generating unit D310 generates the ISI replica, the interference signal replica caused by IAI, and the IAI replica, for each antenna b101-I and transmission opportunity. The interference replica generating unit D310 outputs the generated ISI replica and IAI replica for each antenna b101-I and transmission opportunity to the cancel unit D101-I.

According to the present embodiment, the communication system that performs MIMO transmission generates a frequency spectrum S'(m, n) different from the previous transmission in this way when retransmitting the information bit sequences for each stream. That is to say, according to the communication system, the retransmission efficiency may be increased by updating the spectrum to be clipped during retransmission. Also, according to the communication system, the spectrum to be clipped may be updated for each stream by adding the CRC to each stream. As a result according to the communication system, a more efficient retransmission may be performed as compared to a case when the spectra are not updated.

<Modification>

Further, the clipping unit C1 and C1-1 through C1-S regarding the previously described first and third Embodiments store the clipping information to which a correspondence between the number of retransmissions and the points to be clipped from the frequency spectrum is added, and may update the points to be clipped on the basis of the clipping information. For example, the clipping unit C1 may update the points to be clipped for the retransmission opportunity depending on the number of retransmissions.

For example, when r=4L+1, 4L+2 and L is an integer of at least 0, the clipping unit C1 may perform clipping for the retransmission opportunity as in FIG. 4, and when r=0, 4L+3, 4L+4, may perform the clipping for the first transmission opportunity as in FIG. 4. Also, when r=2L+1, for example, the clipping unit C1 may perform the clipping for the retransmission opportunity as in FIG. 4, and when r=2L, may perform the clipping for the first transmission opportunity as in FIG. 4. That is to say, the frequency spectrum for the $N_{CLIP}$ points having high frequencies of the even number of transmission opportunities may be clipped, and the frequency spectrum for the $N_{CLIP}$ points having low frequencies of the odd number of transmission opportunities may be clipped.

Also, according to the communication system regarding the previously described embodiments, the arrangement sequence of the signal for the frequency spectrum may be changed. Further, according to the communication system, the frequency band that transmits the frequency spectrum may be changed.

Figure 19:
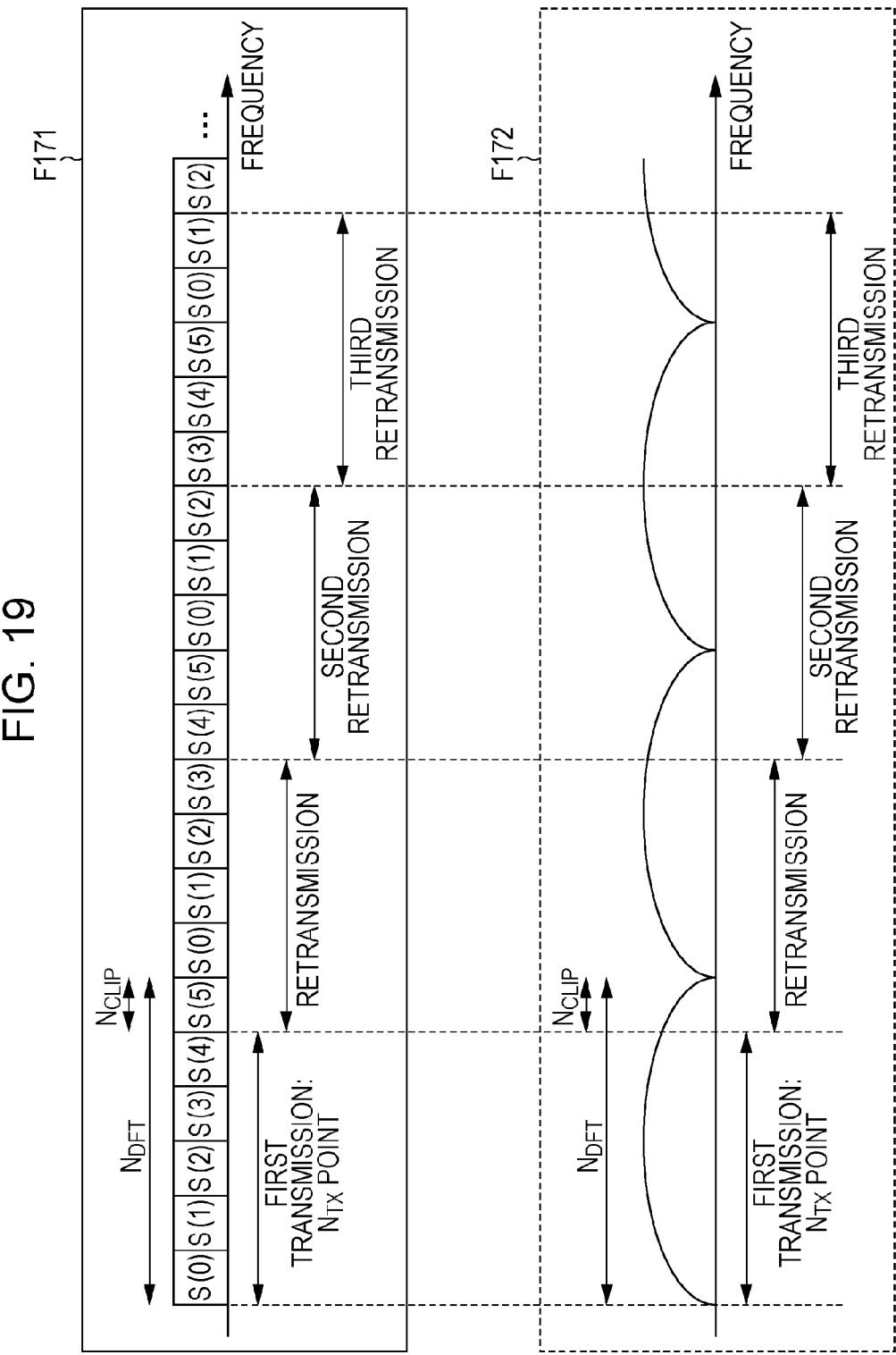
FIG. 19 is a schematic diagram illustrating an example frequency spectrum related to a second modification of each embodiment.

FIG. 19 is a schematic diagram illustrating an example of a frequency spectrum related to a modification 2 of the previously described embodiments. A drawing given the reference numeral F171 in this figure (referred to as F171) is a schematic diagram illustrating an example allocation of frequencies corresponding to a frequency spectrum signal, and a drawing give the reference numeral F172 (referred to as F172) is a schematic diagram representing an example allocation of frequencies corresponding to a frequency spectrum. Here, the horizontal axis in F171 and F172 are the same. The frequency spectrum signal in F171 is S(0) through S(5) (signal for $N_{DFT}$ points). This signal is repeatedly allocated along the frequencies.

The F171 and F172 illustrate that the signal S(5) allocated with the $N_{CLIP}$ number of points having high frequencies is clipped during the first transmission opportunity (r=0). Also, F171 and F172 illustrate that the signal S(0) through S(4) allocated with the $N_{TX}$ number of points having low frequencies is transmitted from the transmitting device to the receiving device during the first transmission opportunity.

F171 and F172 illustrate that the signals S(5) and S(0) through (3) allocated in the $N_{TX}$ number of points having low frequencies, including the signal S(5) clipped at the first transmission opportunity, are transmitted from the transmitting device to the receiving device during the first retransmission opportunity (r=1). Here, the signals S(5) and S(0) through S(4) allocated in the $N_{DFT}$ number of points having low frequencies, including the signal S(5) clipped at the first transmission opportunity, are selected, and the signal S(4) allocated in the $N_{CLIP}$ number of points having high frequencies is clipped.

Similarly, F171 and F172 illustrated that the S(4), S(5), and S(0) through S(2) are transmitted from the transmitting device to the receiving device during the second retransmission opportunity (r=2).

As illustrated in FIG. 19, according to the communication system, by defining the spectrum during retransmission, the repetition of retransmissions in which the spectrum not transmitted still remains during retransmissions, and the transmission of the same spectrum numerous times is prevented. Further, according to the communication system, the transmission bandwidth may be different for each retransmission, and the only the spectrum not transmitted at the first transmission may be transmitted during the retransmission, for example. In this case, according to the communication system, the transmitting bandwidth will be different for each retransmission, and as only the information not received at the first transmission will be received, the effect of the retransmission may be improved.

Also, regarding the previously described first and third Embodiments, the frequency band for allocating the spectrum not clipped may be changed. Also, this frequency band may overlap a portion of the frequency band transmitted at the previous transmission opportunity, or may not overlap.

Figure 20:
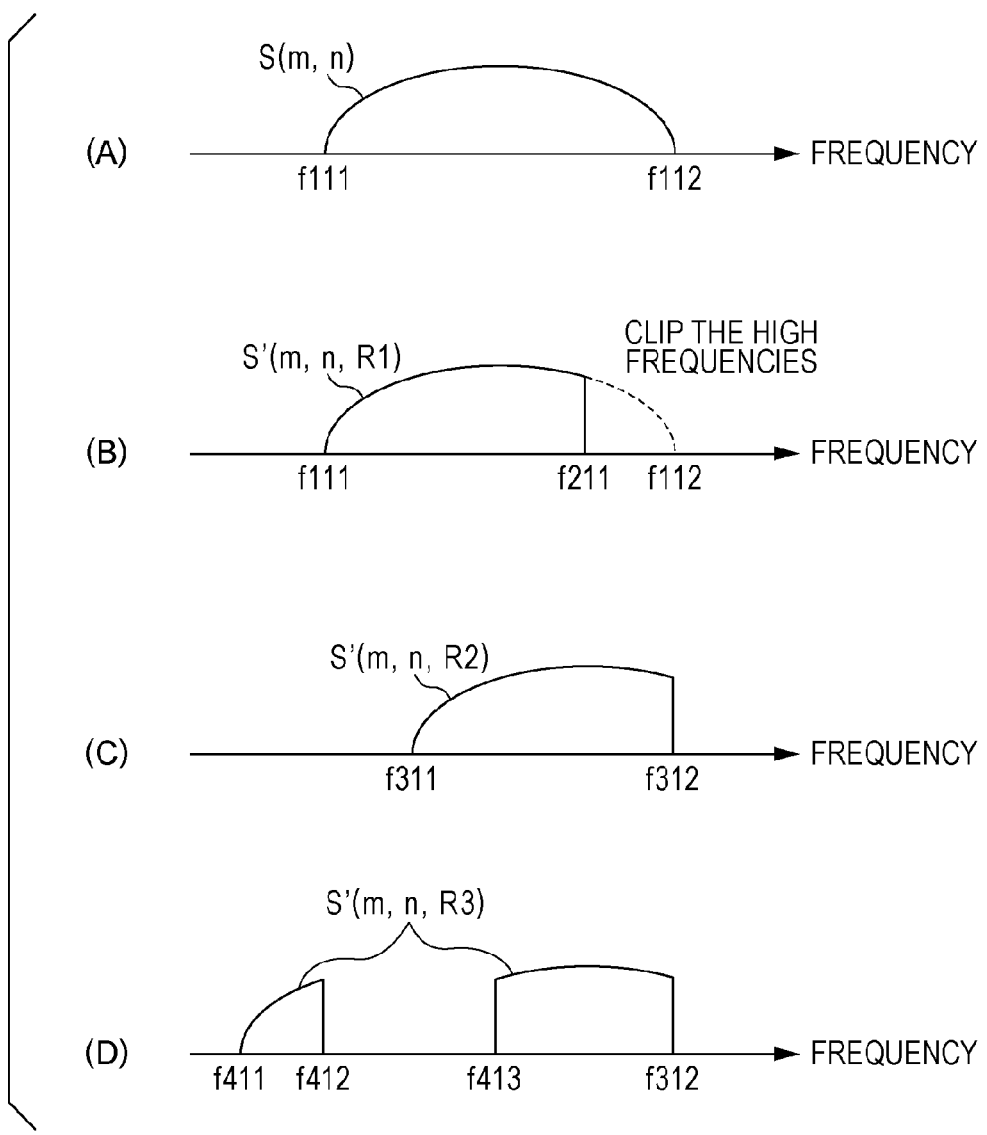
FIG. 20 is a schematic diagram illustrating an example frequency spectrum related to a third modification of each embodiment.

FIG. 20 is a schematic diagram illustrating an example of a frequency spectrum related to a modification 3 of the previously described embodiments. The horizontal axes in FIG. 20(A) through (D) are the same axes, and represent frequency.

The frequency spectrum S(m, n) in FIG. 20(A) represents the spectrum input into the clipping unit C1 and C3. This frequency spectrum S(m, n) is allocated in the bands of a frequency f111 through a frequency f112.

FIG. 20(B) through (D) illustrate examples of the signal output by the mapping unit a117 and a117-1 through a117-Nt at the first transmission opportunity and the retransmission opportunity when the frequency spectrum S(m, n) is input into the clipping unit C1 and C3. For example, the mapping unit a117 and a117-1 through a117-Nt output the signal for the frequency spectrum S'(m, n, R1) as in FIG. 20(A) during the first transmission opportunity (r=0), the signal for the frequency spectrum S'(m, n, R2) as in FIG. 20(B) during the first retransmission opportunity (r=1), and the signal for the frequency spectrum S'(m, n, R2) as in FIG. 20(C) during the second retransmission opportunity (r=2).

The frequency spectrum S'(m, n, R1) in FIG. 20(B) illustrates that the band of a frequency f211 through the frequency f112 (high frequencies) are clipped.

The frequency spectrum S'(m, n, R2) in FIG. 20(C) is the same spectrum as that in which the frequency spectrum S'(m, n, R1) is shifted in the direction of frequency. In this figures, a frequency f311 the frequency f111) through a frequency f312 (≥the frequency f112≥the frequency f211) is allocated in the frequency spectrum S'(m, n, R2). However, the present invention is not limited thusly, and the frequency f312 may be smaller than the frequency f112, and the frequency spectrum S'(m, n, R2) may also be shifted toward the low frequencies.

The frequency spectrum S'(m, n, R3) in FIG. 20(D) is the same spectrum as that in which a portion of the frequency spectrum S'(m, n, R2) is shifted in the direction of frequency. That is to say, the frequency spectrum S'(m, n, R3) is the same spectrum as that in which components of the frequency f311 through a frequency f413 from the frequency spectrum S'(m, n, R2) is shifted to a frequency f411 through a frequency f412.

Also, regarding the previously described first and third Embodiments, the band of the middle frequencies from the frequency spectrum may be clipped.

Figure 21:
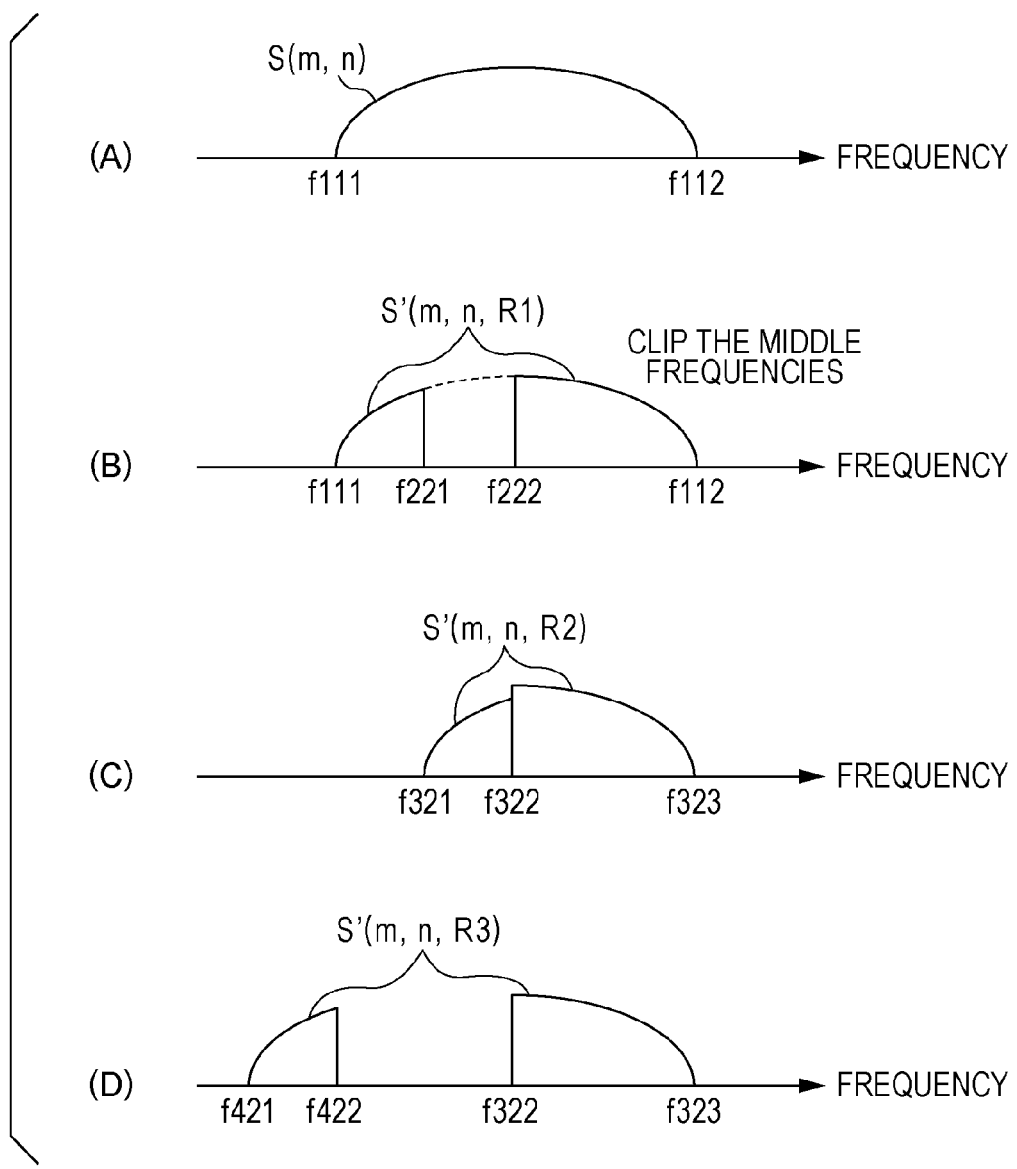
FIG. 21 is a schematic diagram illustrating an example frequency spectrum related to a fourth modification of each embodiment.
Figure 24:
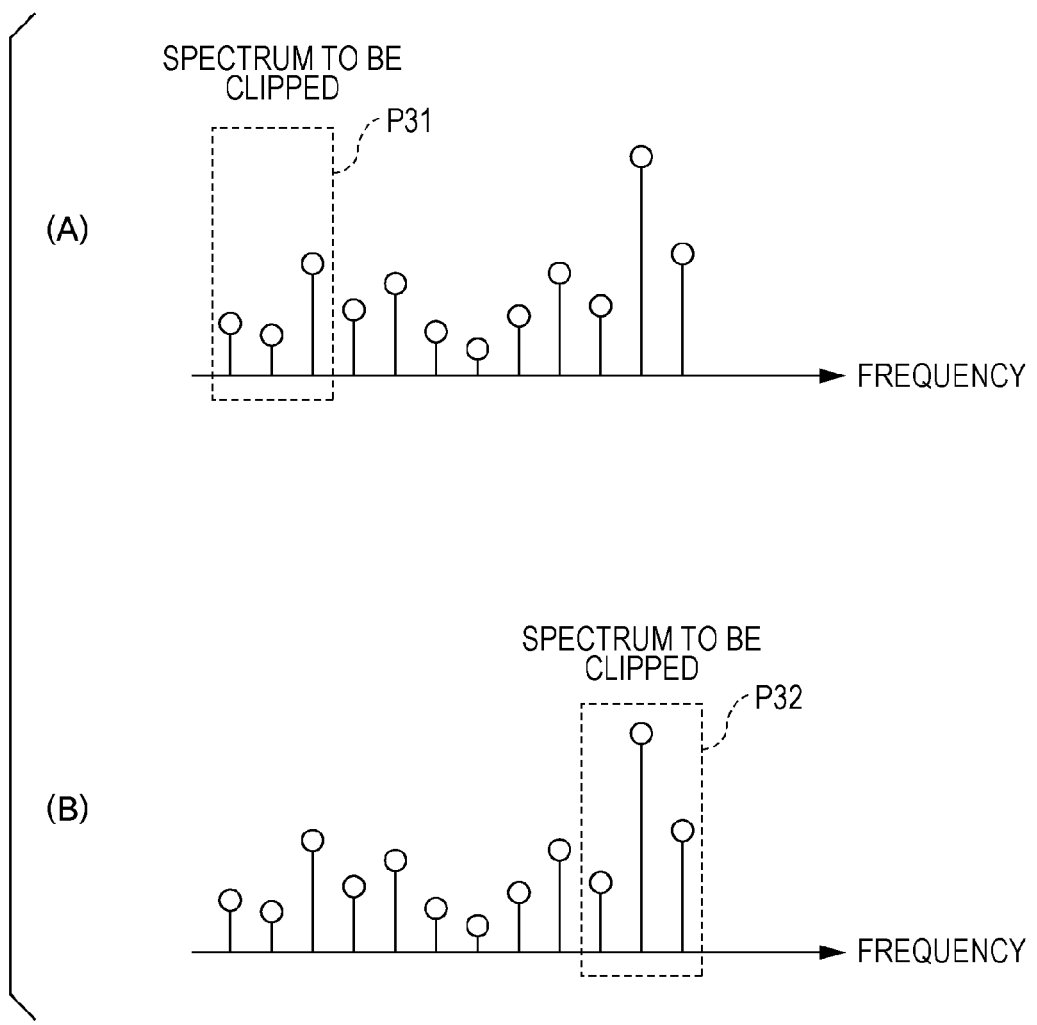
FIG. 24 is a diagram describing a clipped spectrum.

FIG. 21 is a schematic diagram illustrating an example of a frequency spectrum related to a modification 4 of the previously described embodiments. The axes in FIG. 21(A) through (D) are the same axes, and represent frequency.

FIG. 21(A) is the same as figure as FIG. 20(A), and so its description is omitted.

FIG. 21(B) through (D) illustrate examples of a signal output by the mapping unit a117 and a117-1 through a117-Nt at the first transmission opportunity and the retransmission opportunity when the frequency spectrum S(m, n) is input into the clipping unit C1 and C3.

The frequency spectrum S'(m, n, R1) in FIG. 21(B) indicates that frequency f221 frequency f111) through frequency f222 (≤f112), i.e., the middle frequencies are clipped.

The frequency spectrum S'(m, n, R2) in FIG. 21(C) is the same spectrum as that in which the frequency spectrum S'(m, n, R1) is shifted in the direction of frequency, and the spectrum is continuous on the frequency axis. That is to say, the frequency spectrum S'(m, n, R2) is the same spectrum as that in which components of a frequency f222 through the frequency f112 from the frequency spectrum S'(m, n, R1) are shifted to a frequency f322 through a frequency f323, and components of the frequency f111 through the frequency f221 are shifted to a frequency f321 through the frequency f322.

The frequency spectrum S'(m, n, R3) in FIG. 21(D) is the same spectrum as that in which a portion of the frequency spectrum S'(m, n, R2) is shifted in the direction of frequency. That is to say, the frequency spectrum S'(m, n, R3) is the same spectrum as that in which components of the frequency f321 through the frequency f322 from the frequency spectrum S'(m, n, R2) are shifted to a frequency f421 through a frequency f422.

Also, the invention related to the previously described first and third Embodiments and the invention related to the second Embodiment may be combined. For example, as with the second Embodiment, the clipping width may be changed depending on the number of retransmissions regarding the first and third Embodiments.

Also, in the above embodiments, the points to clip frequency spectra do not have to be consecutive.

Also, regarding the previously described second Embodiment, the description assumed that the clipping unit C2 designated $N_{CLIP}$=0 during the retransmission opportunity, but the present invention is not limited thusly, and the ratio of the number of points (or the number of $N_{CLIP}$ points) to which clipping is performed may be decreased without designating $N_{CLIP}$=0. Also, in a case of performing retransmission multiple times, the clipping unit C2 may reduce the percentage of the number of points to perform clipping (or number of points $N_{CLIP}$) with each retransmission.

Further, a portion of the mobile station device a1, a2, and a3 and the base station device b1, b2, and b3 regarding the previously described embodiments may be actualized by a computer. In this case, a program for actualizing these control functions is recorded on a computer-readable recording medium, the program recorded on this recording medium is read by a computer system, and thus may be actualized by execution. Further, the computer system referred to here is a computer system installed in the mobile station device a1, a2, a3 or the base station device b1, b2, and b3, and includes an OS and hardware such as peripheral equipment. Also, the computer-readable recording medium refers to portable media such as flexible disk, magneto-optical disk, ROM, CD-ROM, and other recording devices such as a hard disk installed in the computer system. Further, the computer-readable recording medium may also include that which stores the program dynamically and temporarily, such as with communication lines when transmitting the program via a network such as the Internet or communication lines such as telephone lines, and that which stores the program for certain amount of time such as the volatile memory internal to the computer systems functioning as the servers and clients in this case. Also, the previously described program may be that which actualizes a portion of the previously described functions, and may also be that which may actualize the previously described functions by a combination with other programs already installed in the computer system.

Also, a portion of, or all of the mobile station device a1, a2, and a3, and the base station device b1, b2, and b3 regarding the previously described embodiments may be actualized as LSI (large scale integration) or other integrated circuits. Each functional block of the mobile station device a1, a2, and a3, and the base station device b1, b2, and b3 may be processed individually, or may be processed by grouping portions thereof or all thereof. Also, the type of integrated circuit is not limited to LSI, and may be actualized by specialized circuits or general-purpose processors. Also, when an integrated circuit technology appears to replace LSI as semiconductor technology advances, integrated circuits from this technology may also be used.

Thus, the embodiments of this invention have been described in detail with reference to the drawings, but the specific configurations are not limited to that previously described, and various modifications and such are possible so long as they do not deviate from the scope of this invention.

INDUSTRIAL APPLICABILITY

The present invention is preferable used in communication systems such as transmitting devices and receiving devices.

DESCRIPTION OF REFERENCE NUMERALS 1, a1, a2, a3 mobile station device
2, b1, b2, b3 base station device
b101 antenna b101
a102 receiving unit
a103 control signal extraction unit
a104 response signal extraction unit
a11, a21, a31 transmitting device
a111, a111-1 through a111-S CRC addition unit
a112, a112-1 through a112-S encoding unit
a113, a113-1 through a113-S interleave unit
a114, a114-1 through a114-S modulation unit
a115, a115-1 through a115-S DFT unit
a116, a216, a116-1 through a116-S buffer unit
C1, C2, C1-1 through C1-S clipping unit
a117, a117-1 through a117-Nt mapping unit
a118, a118-1 through a118-Nt OFDM signal generating unit
a121, b121-1 through b121-Nt antenna
b101, b101-1 through b101-Nr antenna
b11, b21, b31 receiving unit
b121, a121-1 through a121-Nt response generating unit
b122 control signal generating unit
b123 transmitting unit
b124 antenna
b111, b111-1 through b111-Nr OFDM signal receiving unit
b112, b112-1 through b112-Nr demapping unit
b113, b213, b113-1 through b113-Nr declipping unit
b114, b114-1 through b114-Nr buffer unit
D1, D2, D3 iterative equalization unit
b115, b115-1 through b115-S CRC determination unit
D101, D201-0 through D201-R, D101-1 through D101-Nr cancel unit
D102, D202-0 through D202-R, D302 equalization unit
D103, D203-0 through D203-R, D103-1 through D103-S IDFT unit
D104, D204-0 through D204-R, D104-1 through D104-S demodulation unit
D105, D205, D105-1 through D105-S de-interleave unit
D106, D206, D106-1 through D106-S decoding unit
D107, D207-0 through D207-R, D107-1 through D107-S interleave unit
D108, D208-0 through D208-R, D108-1 through D108-S replica generating unit
D109, D209-0 through D209-R, D109-1 through D109-S DFT unit
D110, D210-0 through D210-R, D310 ISI replica generating unit
D211 likelihood combination unit
D212 transmit signal generating unit
a310 S/P conversion unit
a319 pre-coding unit
b316 P/S conversion unit

The invention claimed is:

1. A transmitting device comprising:
a DFT unit configured to generate a spectrum from a coded information bit sequence; and
a clipping unit configured to generate a transmission spectrum in which a portion of the generated spectrum is removed, wherein
the transmission spectrum in which the removed spectrum is different from that of a previous transmission when retransmitting the information bit sequence.

2. The transmitting device according to claim 1, wherein the clipping unit is configured to give priority to and transmit the spectrum removed at the previous transmission over the spectrum not removed.

3. The transmitting device according to claim 1, wherein the clipping unit is configured to generate the transmission spectrum in which a spectrum of a bandwidth different from that of the previous transmission is removed.

4. The transmitting device according to claim 3, wherein the clipping unit is configured to determine the transmitting power of the transmission spectrum depending on the bandwidth to be removed.

5. The transmitting device according to claim 1, wherein the clipping unit is configured to generate the transmission spectrum for each of a plurality of streams, and spatially multiplexes and transmits the generated transmission spectra, and generates a transmission spectrum different from the previous transmission, for each of the streams, when retransmitting the information bit sequence.

6. The transmitting device according to claim 1, wherein the previous transmission is a first transmission of the information bit sequence to be retransmitted, and
the previous reception is a first reception of the retransmitted information bit sequence.

7. A receiving device for receiving and decoding a transmission spectrum yielded by a spectrum being generated from a coded information bit sequence, and a portion of the generated spectrum being removed;
   wherein a transmission spectrum in which the removed spectrum is different from that of a previous reception is received and decoded when re-receiving the information bit sequence.

8. A communication system comprising:
   a transmitting device configured to generate a spectrum from a coded information bit sequence, and transmit a transmission spectrum in which a portion of the generated spectrum is removed; and
   a receiving device configured to receive and decode the transmission spectrum transmitted from the transmitting device, wherein
   the transmitting device is configured to generate a transmission spectrum in which the removed spectrum is different from that of a previous transmission, and
   the receiving device is configured to decode the transmission spectrum in which the removed spectrum is different from that of a previous reception.

\* \* \* \* \*